(12) United States Patent
Gavish et al.

(10) Patent No.: US 8,000,319 B2
(45) Date of Patent: Aug. 16, 2011

(54) MULTIPOINT MULTIMEDIA/AUDIO CONFERENCE USING IP TRUNKING

(75) Inventors: Sigi Gavish, Tel Aviv (IL); Roni Even, Tel Aviv (IL)

(73) Assignee: Polycom, Inc., Pleasanton, CA (US)

( * ) Notice: Subject to any disclaimer, the term of this patent is extended or adjusted under 35 U.S.C. 154(b) by 0 days.

(21) Appl. No.: 12/688,453

(22) Filed: Jan. 15, 2010

(65) Prior Publication Data
US 2010/0110938 A1    May 6, 2010

Related U.S. Application Data

(63) Continuation of application No. 10/462,118, filed on Jun. 13, 2003, now Pat. No. 7,701,926.

(51) Int. Cl.
*H04L 12/16* (2006.01)
*H04L 12/66* (2006.01)
*H04M 7/00* (2006.01)

(52) U.S. Cl. ............... 370/352; 370/260; 379/202.01
(58) Field of Classification Search .................. 370/352, 370/260; 379/202.01
See application file for complete search history.

(56) References Cited

U.S. PATENT DOCUMENTS

| | | |
|---|---|---|
| 4,362,928 A | 12/1982 | Sheldon |
| 4,455,455 A | 6/1984 | Little |
| 4,796,293 A | 1/1989 | Blinken et al. |
| 5,318,614 A | 6/1994 | Beguin |
| 5,436,962 A | 7/1995 | Hirata |
| 5,473,363 A | 12/1995 | Ng et al. |
| 5,535,373 A | 7/1996 | Olnowich |
| 5,563,882 A | 10/1996 | Bruno et al. |
| 5,574,911 A | 11/1996 | D'Angelo et al. |
| 5,600,646 A | 2/1997 | Polomski |
| 5,623,312 A | 4/1997 | Yan et al. |
| 5,657,096 A | 8/1997 | Lukacs |
| 5,680,392 A | 10/1997 | Semaan |
| 5,684,527 A | 11/1997 | Terui et al. |
| 5,689,553 A | 11/1997 | Ahuja et al. |
| 5,694,544 A | 12/1997 | Tanigawa et al. |
| 5,729,684 A | 3/1998 | Kuzma |

(Continued)

FOREIGN PATENT DOCUMENTS

EP    0794645 A2    9/1997

(Continued)

OTHER PUBLICATIONS

Toga, James and Jorg Ott. "ITU-T Standardization Activities for Interactive Multimedia Communications on Packet-Based Networks: H.323 and Related Recommendations." Computer Networks. vol. 31, No. 3. North Holland Publishing, Amsterdam, NL. Feb. 11, 1999, pp. 205-223.

(Continued)

*Primary Examiner* — Rasha Al Aubaidi
(74) *Attorney, Agent, or Firm* — Wong, Cabello, Lutsch, Rutherford & Brucculeri, LLP

(57) ABSTRACT

A multipoint communication system uses Internet protocol trunking to facilitate communication between media control units (for sending and receiving multipoint communication signals between end-point devices), a media gateway (for translating between non-Internet protocol multipoint communication signals and Internet protocol communication signals), and a controller (for establishing and controlling a multipoint communication session between the end-point devices). In addition, a multimedia gateway (for use in a multipoint communication system) is described that incorporates an interactive voice response unit through which users of non-Internet protocol devices (connected to the multimedia gateway) interact to establish a communication session with a multipoint communication system.

27 Claims, 15 Drawing Sheets

U.S. PATENT DOCUMENTS

| | | | |
|---|---|---|---|
| 5,737,011 A | 4/1998 | Lukacs |
| 5,740,161 A | 4/1998 | Porter et al. |
| 5,742,772 A | 4/1998 | Sreenan |
| 5,812,652 A | 9/1998 | Jodoin et al. |
| 5,821,985 A | 10/1998 | Lizawa et al. |
| 5,822,301 A | 10/1998 | Arnold et al. |
| 5,835,129 A | 11/1998 | Kumar |
| 5,838,664 A | 11/1998 | Polomski |
| 5,852,466 A | 12/1998 | Komine et al. |
| 5,862,329 A | 1/1999 | Aras et al. |
| 5,867,494 A | 2/1999 | Krishnaswamy et al. |
| 5,867,653 A | 2/1999 | Aras et al. |
| 5,894,321 A | 4/1999 | Downs et al. |
| 5,896,128 A | 4/1999 | Boyer |
| 5,898,676 A | 4/1999 | Apfelbeck et al. |
| 5,907,324 A | 5/1999 | Larson et al. |
| 5,959,662 A | 9/1999 | Shaffer et al. |
| 5,963,547 A | 10/1999 | O'Neil et al. |
| 5,978,363 A | 11/1999 | Dimitrijevic et al. |
| 5,983,269 A | 11/1999 | Mattson et al. |
| 5,995,608 A | 11/1999 | Detampel et al. |
| 6,006,253 A | 12/1999 | Kumar et al. |
| 6,018,360 A | 1/2000 | Stewart et al. |
| 6,021,263 A | 2/2000 | Kujoory et al. |
| 6,038,304 A | 3/2000 | Hart |
| 6,128,509 A | 10/2000 | Veijola et al. |
| 6,157,401 A | 12/2000 | Wiryaman |
| 6,163,531 A | 12/2000 | Kumar |
| 6,181,696 B1 | 1/2001 | Fielding et al. |
| 6,181,786 B1 | 1/2001 | Detampel et al. |
| 6,195,117 B1 | 2/2001 | Miyazaki |
| 6,212,602 B1 | 4/2001 | Wicki et al. |
| 6,259,785 B1 | 7/2001 | Shaffer et al. |
| 6,304,648 B1 | 10/2001 | Chang |
| 6,380,968 B1 | 4/2002 | Alexander et al. |
| 6,438,111 B1 | 8/2002 | Catanzaro et al. |
| 6,463,038 B1 | 10/2002 | Wilson |
| 6,487,196 B1 | 11/2002 | Verthein et al. |
| 6,590,604 B1 | 7/2003 | Tucker et al. |
| 6,591,301 B1 | 7/2003 | Li et al. |
| 6,611,503 B1 | 8/2003 | Fitzgerald et al. |
| 6,614,781 B1 | 9/2003 | Elliott et al. |
| 6,646,997 B1 | 11/2003 | Baxley et al. |
| 6,657,975 B1 | 12/2003 | Baxley et al. |
| 6,683,858 B1 | 1/2004 | Chu et al. |
| 6,728,358 B2 | 4/2004 | Kwan |
| 6,731,734 B1 | 5/2004 | Shaffer et al. |
| 6,738,343 B1 | 5/2004 | Shaffer et al. |
| 6,754,322 B1 | 6/2004 | Bushnell |
| 6,795,429 B1 | 9/2004 | Schuster et al. |
| 6,856,676 B1 | 2/2005 | Pirot et al. |
| 6,879,565 B2 | 4/2005 | Baxley et al. |
| 6,885,658 B1 | 4/2005 | Ress et al. |
| 7,215,647 B2 | 5/2007 | Wilson |
| 7,360,078 B1 | 4/2008 | Lebouill |
| 2001/0002927 A1 | 6/2001 | Detampel et al. |
| 2002/0188731 A1 | 12/2002 | Potekhin et al. |

FOREIGN PATENT DOCUMENTS

| | | |
|---|---|---|
| EP | 0817484 A2 | 4/2000 |
| GB | 2313250 | 11/1997 |
| KR | 1998-028673 | 7/1998 |
| WO | 96/63157 | 11/1996 |
| WO | WO 99/27701 | 6/1999 |
| WO | 0105127 A1 | 1/2001 |
| WO | 0135655 A2 | 5/2001 |
| WO | 0165390 A1 | 9/2001 |

OTHER PUBLICATIONS

Search Report received in corresponding European application No. EP03 013337.5 dated Jun. 18, 2007.

Nancy Greene, Nortel Networks; Michael A Ramalho, Cisco Systems; Brian Rosen, Fore Systems; "Media Gateway control protocol architecture and requirements"; Internet Engineering Task Force; Dec. 9, 1999.

Helen J Wang et al.; "Iceberg: An Internet Core Network Architecture for Integrated Communications"; IEEE Personal Communications; Aug. 2000.

International Search Report received in PCT/IB 00/01764, dated Jun. 22, 2001.

Supplemental European Search Report from related European Application Serial No. 01908089.4, Sep. 3, 2004.

ITU-T Recommendation H.323: *"Visual Telephone Systems and Equipment for Local Area Networks which Provide a Non-Guaranteed Quality of Service"* International Telecommunication Union, Nov. 1996.

Fredette, Paul. "The Past, Present and Future of Inverse Multiplexing." IEEE. Apr. 1994. pp. 42-46.

Schaphorst, Richard. "Status of Standards for Teleconferencing & Multimedia Communications." IEEE. Nov. 1997. pp. 213-217.

MULTIPOINT MULTIMEDIA/AUDIO CONFERENCE USING IP TRUNKING

CROSS REFERENCE TO RELATED APPLICATION

This application is a continuation application of U.S. patent application Ser. No. 10/462,118, filed Jun. 13, 2003, now U.S. Pat. No. 7,701,926 which is incorporated by reference in its entirety, and to which priority is claimed. This application also claims the benefit of, and hereby incorporates by reference, the U.S. Provisional Patent applications Ser. No. 60/388,728, filed 14 Jun. 2002 and Ser. No. 60/396,437 filed 16 Jul. 2002. In addition, the following patents are incorporated herein by reference: (1) U.S. Pat. No. 7,174,365 issued 6 Feb. 2007; (2) U.S. Pat. No. 7,085,243 issued 1 Aug. 2006; and (3) U.S. Pat. No. 7,113,992 issued 26, Sep. 2006.

BACKGROUND

The invention relates generally to multimedia conferencing systems and more particularly, but not by way of limitation, to techniques (systems and methods) for controlling multimedia communication systems from a central control point using Internet Protocol (IP) trunking.

In the current market, most multipoint audio and/or multimedia calls are scheduled in advance through companies that own Multipoint Control Units (MCUs) or Audio Bridges. An MCU provides the capability for three or more terminals to participate in a multipoint audio and/or multimedia conference. An Audio Bridge provides the capability for three or more terminals to participate in a multipoint audio conference. The paragraphs that follow may also use the term "MCU" to refer to an audio bridge used for multipoint audio conferences; therefore, in the description words such as MCU and Audio Bridge may have the same meaning. A terminal is an end-point on a network, capable of real-time, two-way audio, data and/or visual communication with other terminals or an MCU. The information communicated between the terminals and/or the MCU includes control signals, indicators, audio moving color video pictures and/or data. A terminal may provide speech only, speech and data, speech and video, or speech, data and video. A more thorough definition of a terminal can be found in the International Telecommunication Union ("ITU") standards, such as but not limited to: H.320, H.321, H.324 and H.323. The ITU is the United Nations Specialized Agency in the field of telecommunications. The ITU Telecommunication Standardization Sector (ITU-T) is a permanent organ of the ITU. The ITU-T is responsible for studying technical, operating, and tariff questions and issuing recommendations on them with a view to standardizing telecommunications on a worldwide basis. Additional information regarding the ITU can be found at the website address of http://www.ITU.int. Other protocols that may be used over an IP network include the Session Initiation Protocol (SIP). More information about SIP may be found at the website http://www.IETF.org.

If a company owns more than one MCU or more than one audio bridge, it has more flexibility in hosting conferences. However, each MCU must be operated independently from the other MCUs in setting up and controlling conferences. Additionally, the capacity of each MCU is limited to conferences controlled by that MCU. The resources of the multiple MCUs cannot easily be combined to promote more efficient scheduling.

Traditionally, customers wishing to use a multipoint audio and/or multimedia conferencing service must reserve their conferences in advance. The customer must provide several parameters to complete such a reservation, including the number and types of terminals, line-speed, type of audio algorithm, start-time, end-time, video algorithm, type of network, along with other pertinent parameters. Providing these parameters presents a problem to both conference participants and service providers due to the fact that acquiring this information is difficult and providing this information makes the process of setting up or initiating a conference tedious and inconvenient. In addition, the customer must provide this information well in advance of the actual conference to reserve time and resources, and to allow adequate time to process the information and incorporate it into the conference set-up.

Furthermore, participants in an audio and/or multimedia conference may be spread all over the world and each may be using the services of a different Local Service Provider (LSP). Each LSP receives a part of the profit garnered by the multimedia service provider. Therefore, the service providers of audio and/or multimedia conferences find it desirable to use low cost trunking IP trunking is often the least expensive communications trunking technology and therefore the service providers would ideally prefer using it. Also needed by audio and/or multimedia service providers is the ability to offer a single dial-in number for conference services, which is referred to as Single-Dial Conference Service Number (SDCSN). A SDCSN may be a regional or local number and may be different for users in different locations.

SUMMARY

In one embodiment, the invention provides a multipoint communication system. The multipoint communication system includes at least two media control units for sending and receiving multipoint communication signals between a plurality of end-points, a media gateway for translating non-Internet media communication signals to Internet protocol communication signals, and a controller for establishing and controlling a multipoint communication session between end-points communicatively coupled to the media control units and media gateway, wherein communication between the media gateway, the media control units and the controller use Internet protocol communication signals.

In another embodiment, the invention provides a multimedia gateway for use in a multipoint communication system. The multimedia gateway includes a translator to convert non-Internet protocol signals from a first (non-Internet) end-point device to Internet protocol signals, and an interactive voice response unit adapted to interface with the first end-point device when that device is attempting to establish a communication session with the multipoint communication system.

In yet another embodiment, the invention provides a method for conducting a multipoint media conference between a plurality of end-points, wherein at least one of the plurality of end-points is a non-Internet protocol network end-point. The method includes providing at least two media control units adapted to send and receive multimedia communication signals, where the media control units are adapted to communicate over an Internet network. The method also includes providing a media gateway communicatively coupled to each of the media control units through the Internet protocol network, where the media gateway is also adapted to translate non-Internet media communication protocol signals from at least one non-Internet protocol network end-point to Internet media communication protocol signals. The method further includes receiving (at the media gateway) a single-dial conference service number call from the at least one non- Internet protocol network end-point, establishing a multi-point media conferencing session in response to the act of receiving, and routing the translated non-Internet media communication protocol signals from the non-Internet protocol network end-point to at least one of the media control units over the Internet protocol network.

DETAILED DESCRIPTION

Figure 1:
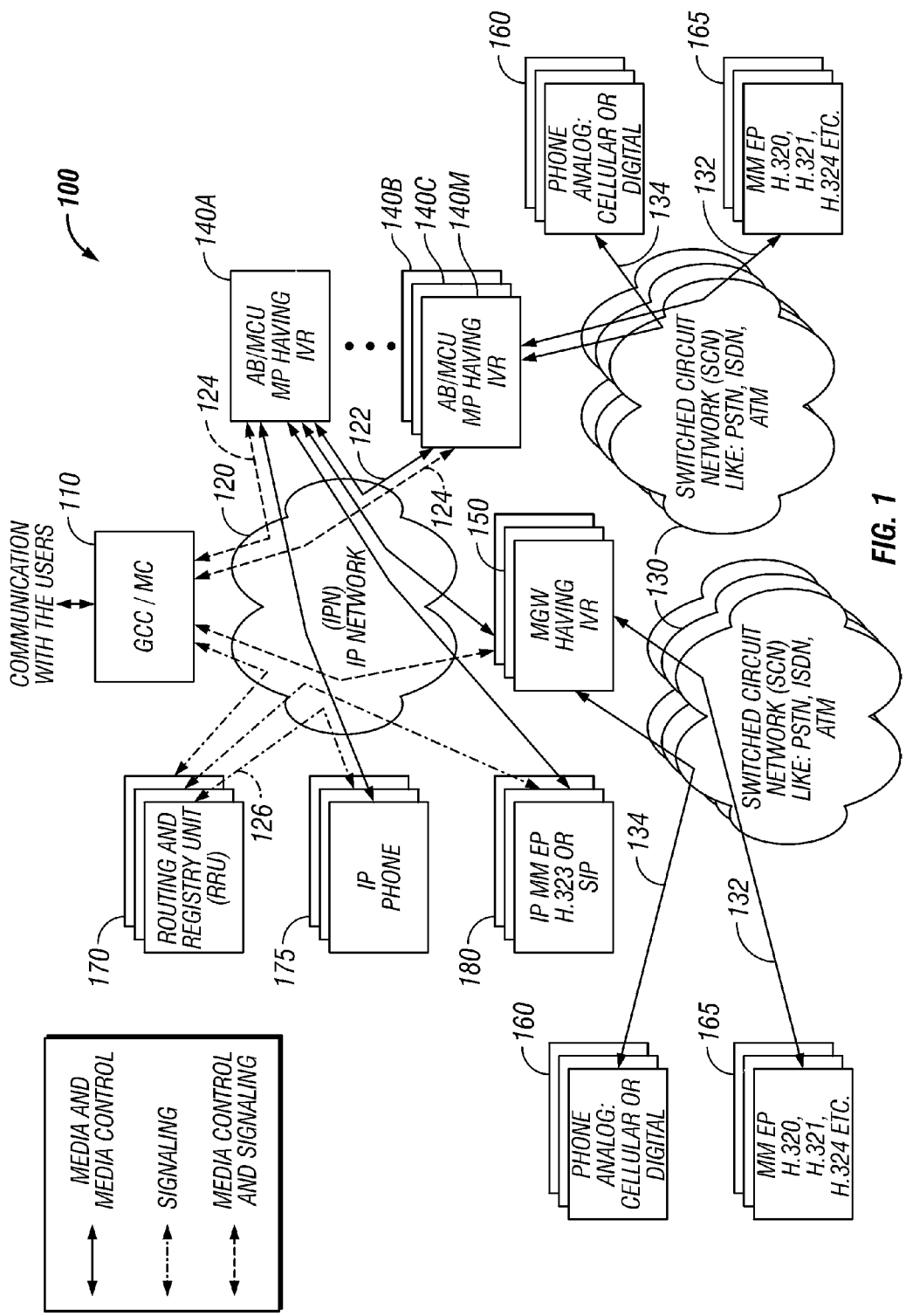
FIG. 1 is a block diagram illustrating the topology of an exemplary audio and/or multimedia conferencing system using IP trunking

Referring now to the drawings, in which like numerals refer to like parts throughout the several views, exemplary embodiments of the present invention are described. For convenience, only some elements of the same group may be labeled with numerals.

FIG. 1 is a block diagram illustrating the topology of an exemplary audio and/or multimedia conferencing system 100 that uses IP trunking and a Decomposed architecture. The system 100 includes the General Conference Controller (GCC) 110 and a plurality of: Routing and Registry Units (RRUs) 170 (the RRUs may be implemented using a Soft Switch, a Gate Keeper, a Session Initiation Protocol (SIP) Proxy/Server, or any similar mechanism); IP Phones 175; end-points for multimedia conferencing over an IP network (IP MM EP) 180; telephones (analog, digital or cellular) 160; end-points for multimedia conferencing over Switched Circuit Network 165; and Switched Circuit Network (SCN) 130. Although three units of each item are shown by way of example and for convenience of presentation, there may be fewer or more than three of each item in a conferencing system. Also, there is no requirement that the number of each item be the same as the number of any other item. In addition, the illustrative system of FIG. 1 includes a Decomposed Multipoint Control Unit (DMCU). An exemplary embodiment of a DMCU is disclosed in U.S. patent application Ser. No. 09/852,438. The DMCU comprises a GCC 110, which is a Media Controller (MC) that controls a plurality of Media Processors (MP) 140a-m and a plurality of Media Gateways (MGW) 150. In some exemplary embodiments, 140a-m and MGW 150 may have Interactive Voice Response (IVR) capabilities for interacting with participants.

An exemplary Decomposed architecture may use H.248 as the communication protocol between the MC 110 and the MP 140a-m and between the MC 110 and the MGW 150. The H.248 protocol refers to resources as "terminations" and to a communication session such as a conference, for example, as a context. Other Decomposed architectures may use Vendor Specific MP supporting protocols for the communication between the MC 110 and the MP 140 and Vendor Specific MGW supporting protocols for the communication between the MC 110 and the MGW 150. Such embodiments may use the term "session" for a communication session. In course of the following description, therefore, terms such as H.248 protocol and Vendor Specific Protocol may have the same meaning. In addition, resources and termination may have the same meaning and context and session may also have the same meaning. Additional information regarding the H.248 protocol can be found by referring to the ITU and/or IETF web sites.

In other exemplary embodiments one of the MPs 140 is selected as the default destination for all incoming calls of the Single-Dial Conference Service Number (SDCSN) and RRU 170 is configured to route those calls to the Default MP (DMP). The Default MP runs an IVR session with the user and communicates with GCC 110 for instructions on how to proceed. The user may respond to this session by using the DTMF functionality of his terminal. From time to time GCC 110 may select another MP 140 as the Default MP (DMP) and will update the appropriate RRU 170.

The communication among GCC 110, MPs 140, MGW 150, IP MM EP 180, IP phones 175 and RRU 170 is done over an IP Network (IPN) 120. IPN 120 may be the Internet, an intranet, LAN or similar technology. In some cases the IPN 120 may be a combination of several IP networks. For example, some of the IP Phones 175 and some of the IP MM EP 180 may be connected directly to the Internet, others may be connected to a corporate intranet and that intranet may be connected to the Internet through a router, a firewall, or other apparatus. The MGWs 150 and the MPs 140 may be located far from the GCC 110, and generally may be located at a local service provider's POP (Point of Presence) for reducing communication expenses and latency when communicating with the GCC 110 over IPN 120.

In the exemplary system 100 the DMCU supports connections with various types of multimedia terminals including, but not limited to, H.321, H.324 and H.320 terminals 165 as well as telephones (analog, digital or cellular) 160. Those terminals are connected to Switched Circuit Networks (SCN) 130 such as, but not limited to, PSTN, ISDN, ATM, etc. The exemplary system 100 also supports H.323, SIP Multimedia terminals 180 and IP Phones 175 that are connected to IP network 120. IP phones may use signaling protocols such as, but not limited to SIP, H.323 or vendor specific protocols. The connections to the terminals are illustrated as network clouds (120 and 130).

Each one of connection clouds 130 is connected to one or more than one MGW 150 and/or MPs 140, which are connected to the clouds via lines 134 and 132 using protocols like H.320, H.321, H.324 and PSTN, according to the type of the end-point and the network. IP terminals 175 and 180 communicate with GCC 110 via RRU 170 using virtual signaling lines 126 and communicate with the MPs 140 via virtual media line 122. An MP 140 may communicate with other MPs, IP terminals 175 and 180 and MGWs 150 via virtual media line 122. Moreover, an MP 140 communicates with the GCC 110 via media control and signaling lines 124. A MGW 150 may communicate with MPs 140 via virtual media line 122 and with the GCC 110 via media control and signaling lines 124.

Control and signaling lines 124 may use standards protocols like H.248 protocol or vendor specific protocols. Virtual signaling lines 126 may use components of H.323 (H.225, H.245), SIP, or vendor specific protocols depending on the type of the end-point. Virtual media lines 122 may use Real-time Transport Protocol (RTP).

By way of example and for convenience of presentation, MP 140a has been selected as the conference builder of an exemplary conference. MP 140a may be a different MP than the DMP.

Figure 2:
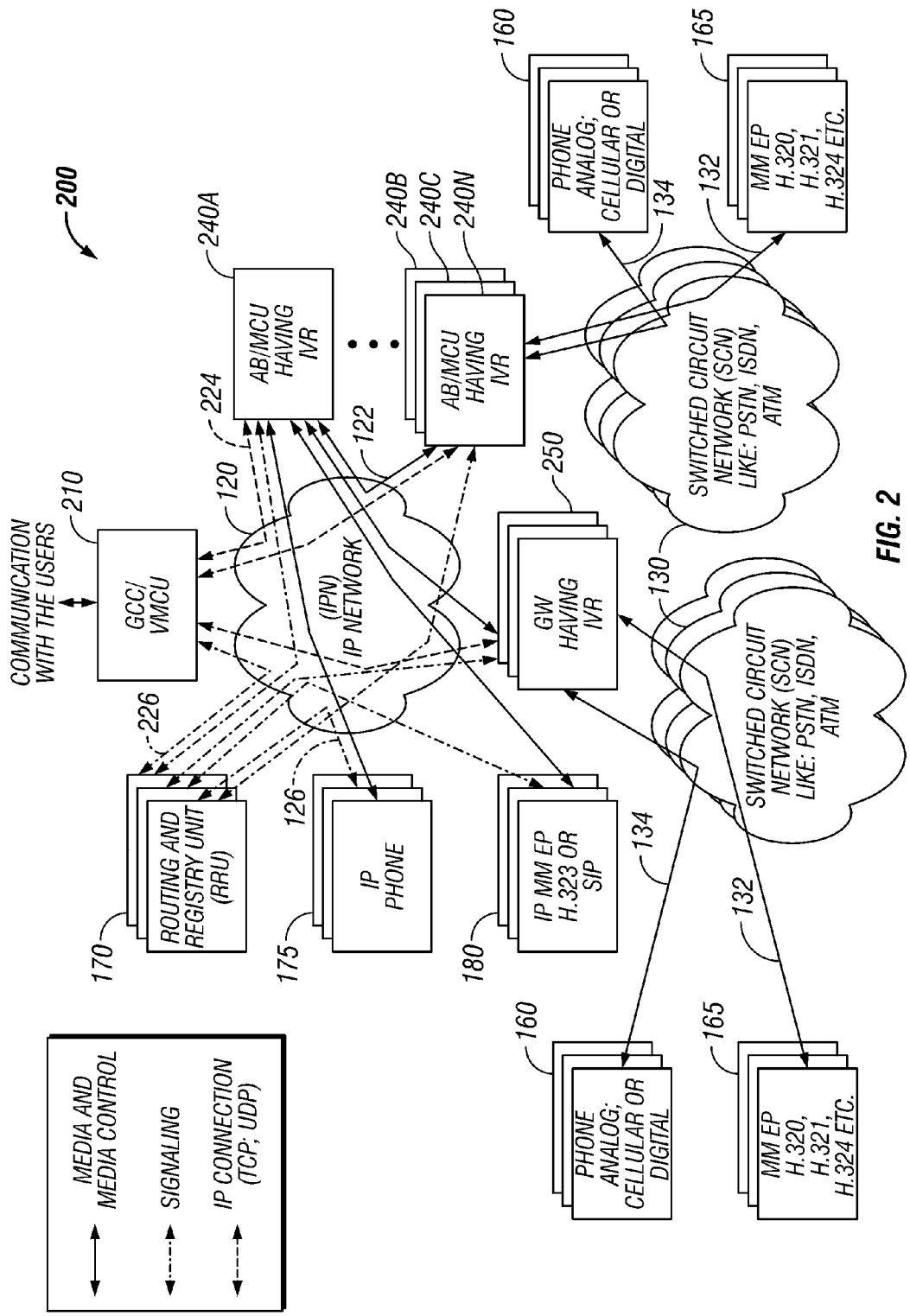
FIG. 2 is a block diagram illustrating the topology of another exemplary audio and/or multimedia conferencing system using IP trunking.

FIG. 2 is a block diagram illustrating the topology of another exemplary audio and/or multimedia conferencing system 200 that uses IP trunking. The General Conference Controller (GCC) 210 of system 200 is implemented by a Virtual MCU architecture. System 200 includes a plurality of audio and/or multimedia end-points, 175, 180, 160 and 165 connected to a plurality of connection clouds 130 and 120 as in system 100. However, system 200 uses a Virtual MCU as the controller (GCC 210) of the audio and/or multimedia conference system instead of a DMCU. An exemplary virtual MCU (VMCU) architecture has been disclosed in U.S. patent application Ser. No. 09/708,898. A plurality of common MCUs and/or Audio Bridges 240 may be used as conference builders and/or Gateways and a plurality of Gateways (GW) 250 may be used in communication between Switched Circuit Networks (SCNs) 130 and the IPN 120. Each GW 250 and/or AB/MCU 240 may have IVR capabilities.

In other exemplary embodiments, one of the MCUs and/or Audio bridge (AB/MCU) 240 may be selected as the default destination for all incoming calls of the SDCSN. RRU 170 is configured to route incoming calls to the selected AB/MCU. This AB/MCU runs an IVR session with the user, and in communication with GCC 210 the AB/MCU instructs the user how to proceed. From time to time GCC 210 may select another AB/MCU 240 to be the Default AB/MCU and updates the appropriate RRU 170.

Communication among the GCC 210, GWs 250 and AB/MCU 240, IP MM EP 180, IP phones 175, and RRU 170 is done over IP Network (IPN) 120. Some of the GWs 250 and some of the AB/MCU 240 may be located far from GCC 210, close to a local service provider's POP (Point of Presence) for reducing communication expenses. Those units communicate using the IPN 120 with GCC 210 and other MCUs.

An AB/MCU 240 may communicate with other AB/MCUs, IP terminals 175 and 180 and GWs 250 via virtual media lines 122. For control, AB/MCU 240 communicates with the GCC 210 via IP connection 224 and for signaling with RRU 170 via virtual signaling lines 226. Virtual signaling lines 226 may use H.323, SIP, RAS or Vendor Specific Protocols, or another appropriate protocols. A GW 250 may communicate with AB/MCUs 240 via virtual media line 122. For control, GW 250 communicates with GCC 210 via IP connection 224, and for signaling GW 250 communicates with RRU 170 via virtual signaling lines 126. Control lines 224 may use a proprietary communication protocol over IP. Signaling virtual lines 126 may use components of H.323 (H.225, H.245) or SIP, depending on the type of the end-point. Virtual media lines 122 use Real-time Transport Protocol (RTP).

By way of example and for convenience of presentation AB/MCU 240a has been selected as the conference builder of an exemplary conference. AB/MCU 240a may be a different MCU than the Default MCU.

Figure 3:
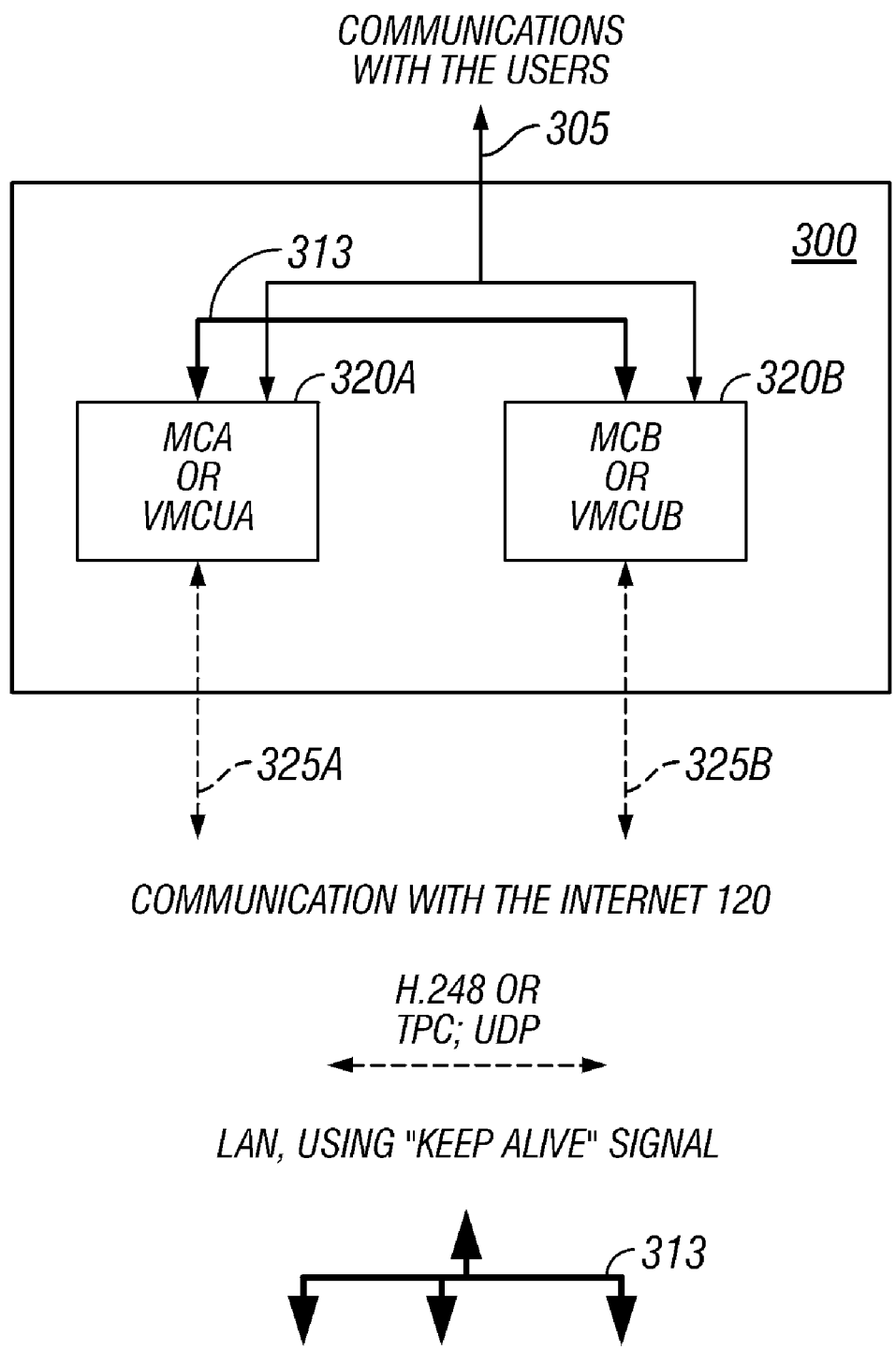
FIG. 3 is a block diagram illustrating an exemplary mechanism for supporting a fully redundant system, without a single point of failure.

FIG. 3 is a block diagram illustrating an exemplary mechanism 300 for supporting "No Single Point of Failure." GCC 300 comprises two MCs or two VMCUs, 320a and 320b, depending on the type of the architecture. One unit duplicates the other. Both units 320a and 320b are connected to IPN 120 via connection lines 325a and 325b, both units may have the same IP address. On the other side, both units are connected via LAN 313 running Keep Alive Signal among the two. During power-on one of them becomes active. For example, the MC or VMCU whose address on LAN 313 is a smaller number may become active. The second MC or VMCU is in a Hot Stand-By situation, during which it listens to the activity over IPN 120 but does not respond. Only the active MC or VMCU responds to traffic over IPN 120 and at the end of each process the active MC or VMCU updates the other unit. From time to time the stand-by unit may verify that the active unit is alive. The verification may be done periodically. Other embodiments may define other criteria to verify that the active unit is operating properly. For example, the stand-by unit may start a timer upon sensing a new request over IPN 120. The timer is reset upon listening to the response coming from the active unit. If the timer terminates before the response, the stand-by unit may become the active unit and take control over GCC 300.

Figure 4:
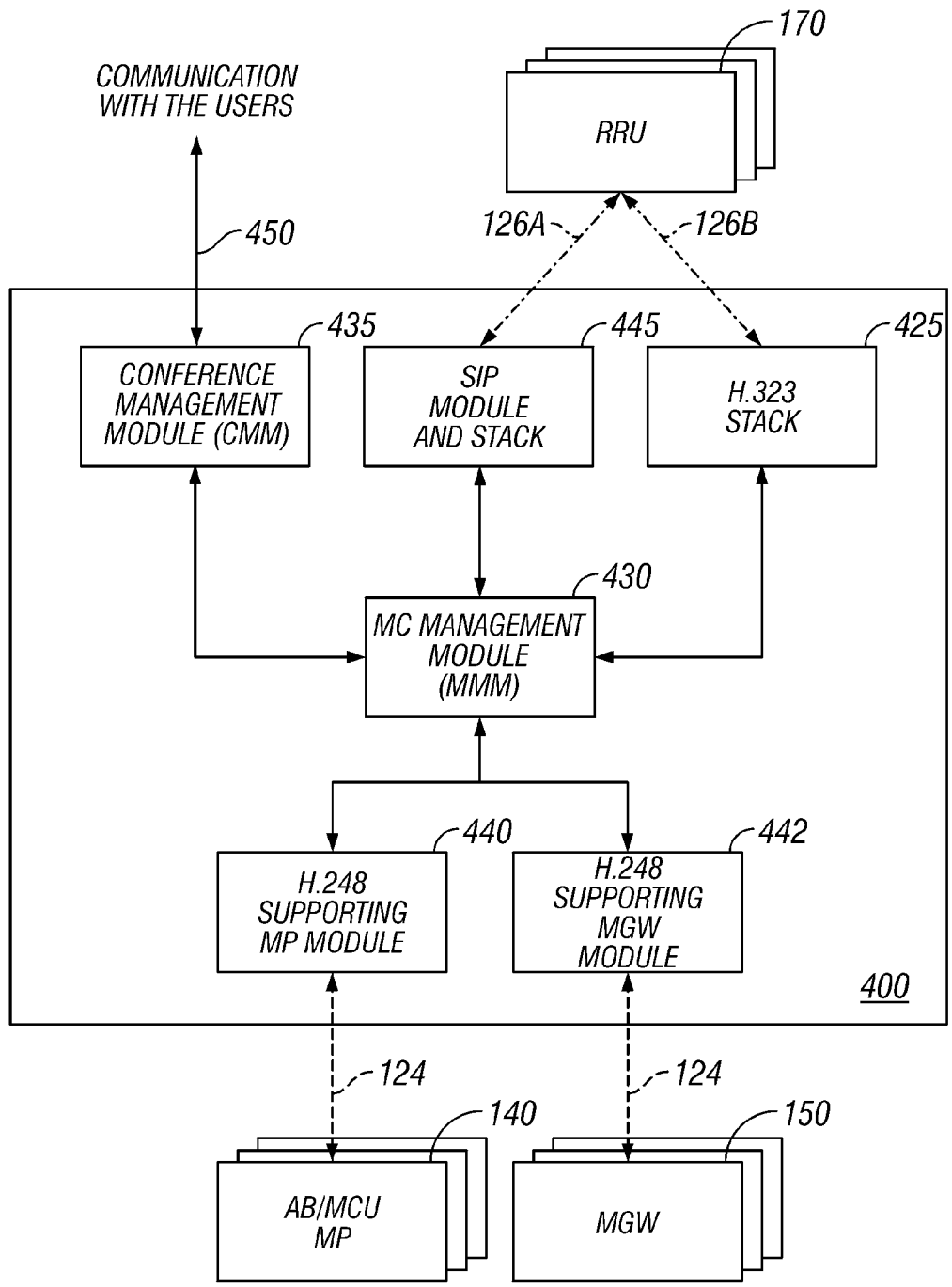
FIG. 4 is a block diagram illustrating an exemplary embodiment of a General Conference Controller that is based on a Decomposed Multipoint Control Unit architecture.

FIG. 4 is a block diagram illustrating an exemplary embodiment of a GCC that is based on a Decomposed MCU architecture. GCC 400 is based on the Media Controller (MC) section of a Decomposed MCU that is described in U.S. patent application Ser. No. 09/852,438. MC 400 communicates with end-points located over SCN 130 via IPN 120 and through one of the MGWs 150 or MPs 140 (FIG. 1). The MC 400 is a platform independent system solution for controlling one or more MPs 140 and one or more MGW 150 (FIG. 1). The MC 400 may be a physical unit or a software program residing in a Media Gateway Controller (MGC) or a software program residing in a conventional MCU or in a Soft Switch.

In an exemplary embodiment of the present invention, the MC 400 includes several modules that are controlled by an MC Management Module (MMM) 430. The MC may include modules such as, but not limited to, H.323 Stack 425, SIP Module and stack 445, Conference Management Module (CMM) 435, H.248 supporting MP protocol Module 440, and H.248 supporting MGW protocol 442. The CMM 435 may be a part of the MC or it can be an external module that resides in an external general computer system. Other exemplary embodiments may use a Vendor Specific Protocol to communicate with the MP or MGW instead of a standard protocol such as H.248.

In the exemplary embodiment of FIG. 4, the MC 400 is connected, in both directions, to the external world via H.323 Module 425, SIP Module 445, H.248 supporting MP protocol Module 440, and H.248 supporting MGW protocol Module 442. The MC 400 communicates with end-points 175 and 180 that are connected to IP Network 120, through routes registered with RRU 170. MC 400 uses H.323 Module 425 to communicate with H.323 terminals. Module 425 may comprise three sub-modules for processing the H.323 components: H.225 sub-module which processes call signaling data; H.245 which processes call control information; and the Registration, Admission, and Status (RAS) sub-module for processing the RAS component. The processed information is transferred to the MMM 430. MC 400 may include a plurality of H.323 Modules 425, which may be connected so that a H.323 module is connected to each switched packet network to which the MC is connected. The MC 400 communicates with SIP end-points, which are connected to the packet switch network via the SIP module 445 for call signaling and call control. The information is processed by the SIP stack and is transferred to MMM 430. SIP module 445 gets signaling and the control information from IP MM EP 180 and IP Phones 175 via RRU 170.

Users 160 and 165 (not shown in FIG. 4), which are connected over SCN 130, communicate with the MC 400 via the MP 140 or via MGW 150 through H.248 MP supporting protocol Modules 440 and H.248 MGW supporting protocol 442, respectively. In communication with end-points that use protocols such as H.320, H.321, H.324, etc., the MP 140 and MGW 150 multiplex the signaling and control components into a multiplexed stream and also demultiplex the signaling and control components from a multiplexed stream. The MP 140 and MGW 150 may translate the signaling and control components into H.248/Megaco protocol and transfer them to the MC 400 via H.248 MP supporting protocol Module 440 or H.248 MGW supporting protocol Module 442. In this exemplary embodiment, the MPs 140 and MGW 150 may have the capability to perform an IVR session with a participant, who may be connected over SCN 130, for defining the participant's needs and/or preferences and to communicate these parameters to MC 400. In the other direction, MPs 140 and/or MGW 150 translate the instructions from MC 400 to vocal messages and transmits the messages to the user over SCN 130. More information about the IVR session is described below in conjunction with FIGS. 8 and 9.

In another exemplary embodiment of the present invention, one of the MPs 140 is selected as the default MP (DMP) for any new call to the Single-Dial Conference Service Number (SDCSN). The RRU 170 is configured to route any packets with the destination of the single dial-in number to the DMP. MC 400, from time to time, may select another MP as the default MP. In this exemplary embodiment, only the DMP runs the IVR session with a user that dials the SDCSN. In this embodiment, users 160 or 165 communicate with MC 400 via the MP 140 or via MGW 150. In communication with end-points that use protocols such as H.320, H.321, H.324, etc., the MP 140 and/or MGW 150 multiplexes and/or demulitplexes the signaling and control components to/from a multiplexed stream and translates them into control and signaling components of H.323 (H.225, H.245 and RAS) or SIP and sends them over IPN 120 to GCC 110. GCC 110 starts the IVR session on the DMP and connects the media from the MGW 150 or MP 140 to the DMP. The DMP uses RTP for transporting the vocal messages over IPN 120 to the appropriate MGW or MP. The MGW or MP multiplexes the different type of packets into one stream, according to the conference protocol that is used by the end-point. The MGW or the MP transfers the converted signals over SCN 130 to the appropriate users. More information about the IVR session is described below in conjunction with FIGS. 8 and 9.

The MMM 430 manages the resources (terminations) of the different MPs 140 and MGWs 150 that are controlled by the MC 400 and the events that occur. The MMM 430 may use an internal or external CMM 435. CMM 435 comprises a plurality of multimedia conferencing management tools such as, but not limited to, a conference reservation manager, a conference manager, a reports manager, a system administrator tool, and databases.

CMM 435 may be connected to the external world via an IP connection 450. The external connection 450 enables management communication with customers, or vendors, where the communication may include but is not limited to information regarding to conference reservations, requests for reports, etc. The CMM 435 is the interface between the customer and the MC 400 and it manages the conference reservations, reports, and similar tasks while the MMM 430 controls the ongoing conferences (contexts).

A Conferences Reservation Manager (not shown in the drawings) accepts requests for multimedia session reservations via IP connection 450 and uses the reservation parameters to verify that a reservation can be accepted. The reservation parameters can be parameters like but not limited to the number and types of terminals, line-speed, type of audio algorithm, start-time, end-time, video algorithm, type of network, and any other pertinent parameter. The Conferences Reservation Manager then stores the reservation record in the database. If the session has to start immediately, the Conferences Reservation Manager passes the information to the MMM 430. The Conference Manager 435 starts a reserved session when the session's time to start arrives. The Conferences Manager loads the session onto the target MP, to which the session has been assigned, via the MMM 430 and H.248 module 440 and gets status information from all of the MPs concerning ongoing sessions. MMM 430 also updates RRU 170 via SIP Module 445 or via H.323 Modules 425 with the routing instructions for incoming calls of the reserved conference.

The Reporting Manager (not shown in the drawings) builds reports. The reports may include, but are not limited to, the length of time resources were used, which resources were used for a specific session, and the percentage of resources used during a specified time period. The reports are built upon the receipt of a report request from the site operator via IP connection 450.

The System Administrator (not shown in the drawings) serves as an input tool for the MC parameters. MC parameters may include, but are not limited to, the maximum number of MPs 140 and MGW 150 controlled by the MC 400.

In an exemplary embodiment of the present invention, the databases include databases for reservations, users, and any other data required for the operation of the MC 400. A database can be an external database including, but not limited to, a database using LDAP or ILS.

The MMM 430 keeps information concerning the terminations of the MPs 140 and MGW 150, i.e., audio terminations, video terminations, etc. When the MMM 430 gets a request to initiate a conference from CMM 435, it allocates the appropriate terminations to a context that represents the requested conference. An exemplary method for different types of conferences and contexts are described below in conjunction with FIGS. 6a to 6e.

A termination is a logical entity on a MP that sources and/or sinks media and/or control streams. Terminations have unique identities (TerminationIDs), assigned by the MP Management Module at the time of their creation. The following are a few examples of terminations: H.221 MUX/DEMUX; ISDN ports; Audio mixers; IVR; etc.

The MMM 430, based on the available terminations of an MP, also calculates terminations availability for future context reservations. MMM 430 may receive messages, such as call start, call terminate, etc., from the MPs 140 and MGWs 150 and stores the messages in a database. The MMM 430, based on the signaling and control signals that it receives from the various terminals via RRU 170 and/or MGWs 150 and/or MPs 140 via H.323 Stack 425 and/or H.248 Module 440 and/or SIP module 445. MMM 430, in cooperation with CMM 435 provides for capability negotiation with all terminals to achieve at least one common level of communication. MMM 430 selects the DMP that runs the IVR session with the user(s) that dial the SDCSN. MMM 430 updates the RRU 170 with the appropriate routing instructions. MMM 430 may also control conference resources and may start and terminate the call signaling and control. The MMM 430 decides which MP 140 will handle a context (conference) and the terminations in said MP that will be used in said context. At the end of a conference, the MMM 430 will manage the termination of the streams in the context. The MMM 430 may manage the streams inside the context according to the current status of the conference.

Figure 5A:
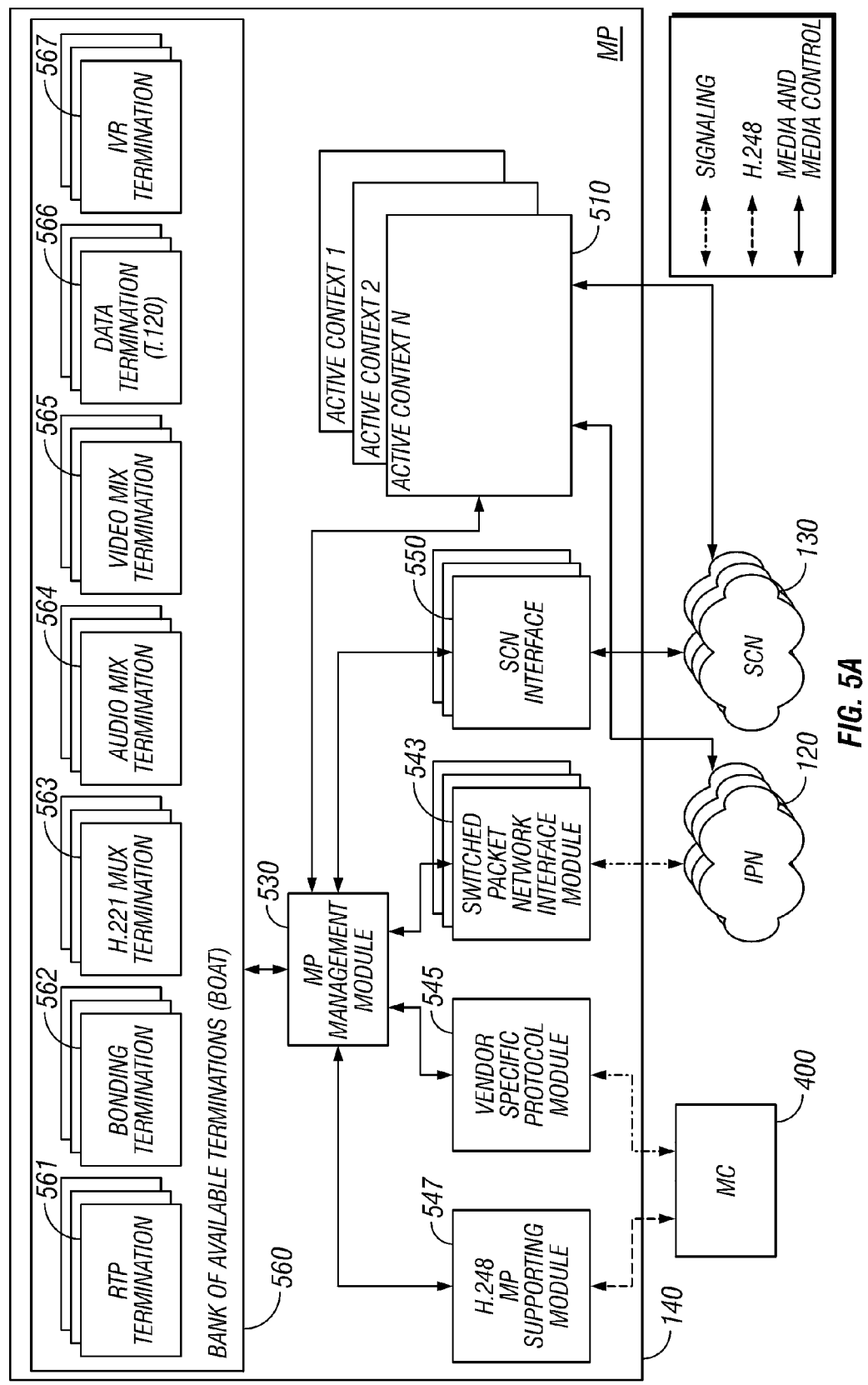
FIG. 5a is a functional block diagram of an exemplary Media Processor.

FIG. 5a is a functional block diagram of an exemplary MP 140. The MP 140 provides media processing, mixing, switching, transcoding or other processing of media streams (audio, video, and data) under the control of the MC 400. The MP 140 may process a single media stream or multiple media streams depending on the type of conference supported. Although call set-up, call control, call signaling, and call management are done by the MC 400, the MP 140 can establish a tunnel them between the SCN 130 or the Internet Protocol Network 120 users and the MC 400. The MP includes a plurality of SCN Interface Modules 550. Each SCN Interface represents layer 3 of Switch Circuit Network Protocols. Module 550 accepts a SCN dial-in number. When an SCN Interface is involved in a current context (one of active contexts 1→n 510), its SCN Interface Module 550 becomes a part of that context. In the cases where signaling, control and media are multiplexed (H.320, H.321, H.324, etc.) the MP 140 will demultiplex the streams, then the MP uses signaling, tunneling or backhaul, or other communication means to transfer the call control and/or the call signaling messages to the MC 400. The communication with MC 400 may use standard protocols such as, but not limited to, H.248 or vendor specific protocols.

In an exemplary embodiment of the present invention, a functional MP 140 includes several modules such as, but not limited to: a plurality of Switched Packet Network Interfaces (SPNI) 543 to communicate with end-points that are using SIP or H.323 protocols; H.248 Module 547 and a Vendor Specific Protocol Module 545 to communicate with MC 400; an SCN Interface 550; a plurality of active contexts 510 and a Bank of Available Terminations (BOAT) 560. An MP Management Module (MPMM) 530 controls those modules. The BOAT 560 comprises several groups of terminations. Exemplary types of terminations, 561 to 567, are shown in FIG. 5a. Other types of terminations may be used. Each group includes plurality of terminations from the same type.

A context is an association between terminations. A Context can describe the topology (who hears/sees whom) and the media mixing and/or switching parameters if more than two terminations are involved in the association/context. There is a special context called the null context. The null context contains terminations that are not associated to any other termination, BOAT 560 represents the null context in FIG. 5a. An exemplary context can be a videoconference of three (3) participants: one uses an H.323 end-point and two use H.320 end-points with bit rates that are different from that used by the first participant. This context includes the following terminations: two Bonding Terminations 562, one RTP termination 561, two MUX terminations 563, an audio mix termination (AMT) 564 and a video mix termination (VMT) 565. Another exemplary context may be the Welcome Context (WCC) context. WCC is a context that is generated in response to a new "dial-in-call" that is used the Single-Dial Conference Service Number (SDCSN) prompting the user to define his preferences or needs. Two exemplary contexts are described in detail below in conjunction with FIGS. 6a and 6b. Each RTP termination has its own transport address and each Bonding termination has at least one ISDN number.

Although three active contexts 510, three SCN Interfaces 550, three Switched Packet Network Interface (SPNI) Modules 543 and three terminations in a group, 561 to 567, at BOAT 560 are illustrated, the present invention is not limited to a particular number and the presented configuration is intended to be illustrative of an exemplary configuration.

Some of the units and terminations that compose the MP 140 are units that exist in a typical MCU, for instance a Polycom MGC 100. Some unique modules of an MP 140 are MPMM 530, H.248 Module 547, and vendor specific protocol module 545. The MP 140 may be a physical unit or a software adaptation of a conventional MCU. The MP 140 may be also a software program running on a general computer. The MP 140 gets and transmits operational control to and from the MC 400 via H.248 Module 547. Media communication with the users is done directly through the appropriate context 510.

Although call set-up, call control, call signaling and call management are done by the MC 400, the MP 140 can tunnel them between the SCN 130 or the Packet Switch Network 120 users and the MC 400. The MP 140 includes a plurality of SCN Interface Modules 550. Each Module 550 accepts a SCN dial-in number. When an SCN Interface is involved in a current context, its SCN Interface Module 550 becomes a termination in the appropriate active context 1→n 510.

An RTP Termination 561 handles the different media packet streams it receives from the SPNI 543 and separates them to four different streams as instructed by the MC. The four different streams are: (1) control information which, if received in the MP 140, is transferred to the MC 400 via H.248 module 547; (2) data that is transferred to data terminations (DT) 566; (3) video that is transferred to video mix terminations (VMT) 565; and (4) audio that is transferred to audio mix terminations (AMT) 564. In the outgoing direction, an RTP Termination 561 receives the streams from the DT 566, VMT 565, and AMT 564, and sends them to the remote terminal. Stream synchronization like lip-synch can be done in the RTP 561 or in a VMT 565 and AMT 564 according to MC 400 commands.

Bonding terminations 562 handle the bonding of 'N' ISDN 64 kbit channels to one call. More information about bonding can be found in standard ISO/IEC 13871 at the ISO website, http://www.iso.ch.

H.221 MUX terminations 563 handles the multiplexing and demultiplexing of the H.221 stream. A H.221 MUX termination receives the bit rate of the call, the structure of the H.221 stream and demultiplexes the stream to audio, video, data and control streams. The control information is transferred to MPMM 530 that may use part of the information and transfer the information, which is required by the MC 400, to H.248 Module 547.

Media processing terminations of an exemplary MP 140 include AMT 564; VMT 565 and DT 566. AMTs 564 handle audio mixing, accepting and mixing audio streams from all participants associated with a given context. The mixing options may be based on different criteria. For example, the N loudest speakers or N specific streams, etc.

VMTs 565 may be one of four types, not shown in the drawing:
  (1) Video switch termination—conducts a video switching conference. In this conference type, one of the incoming video streams is sent to all the other participants. The selected stream can be the video stream of the active speaker who will receive the previous speaker stream or the MC 400 may decide the displayed stream for each participant. Voice activated switching may be managed automatically by the MPMM 530, or by the MC 400. In this type of conference all video streams have the same parameters (line rate, frame rate, algorithm).
  (2) Video mixing termination—conducts a video mix session that mixes 'N' out of 'M' streams. The MC 400 defines the incoming stream IDs for the termination, the layout and, if required, switches the content of a window according to the active speaker and the selected streams (participants) to be mixed for each participant. Video stream parameters may be different for each stream.
  (3) Video softmix termination—a video mix session that mixes four incoming streams that have the same parameters (e.g., mixing four H.261 QCIF streams to one H.261 CIF outgoing stream).
  (4) Transcode termination—similar to a video switch termination, but the MC 400 defines the video mode of the termination and allows it to transcode video streams that have different parameters.

In cases where the conference includes data, the DTs 566 process the data protocols like T.120 etc. and transfers back the processed data.

IVR Terminations 567 handle the conversion of digital messages to vocal messages that are transferred to the user who dialed the SDCSN. An IVR Termination 567 may prompt the user to define his needs by requesting that he choose from a given set of options by pressing a specified sequence on a touch-tone telephone that generates Dual Tone Multiple Frequency (DTMF) tones, which may then be analyzed. The IVR termination may be used in a WCC.

The composition of a termination unit may be similar to, but is not limited to, AMTs 564; VMTs 565; DTs 566; H.221 MUX terminations 563 and/or RTP terminations 561. A RTP termination 561 may be a modified physical unit which belongs to a common MCU or a common audio bridge, with some modifications. The modifications may include the mapping of the physical unit into logical terminations.

Figure 5B:
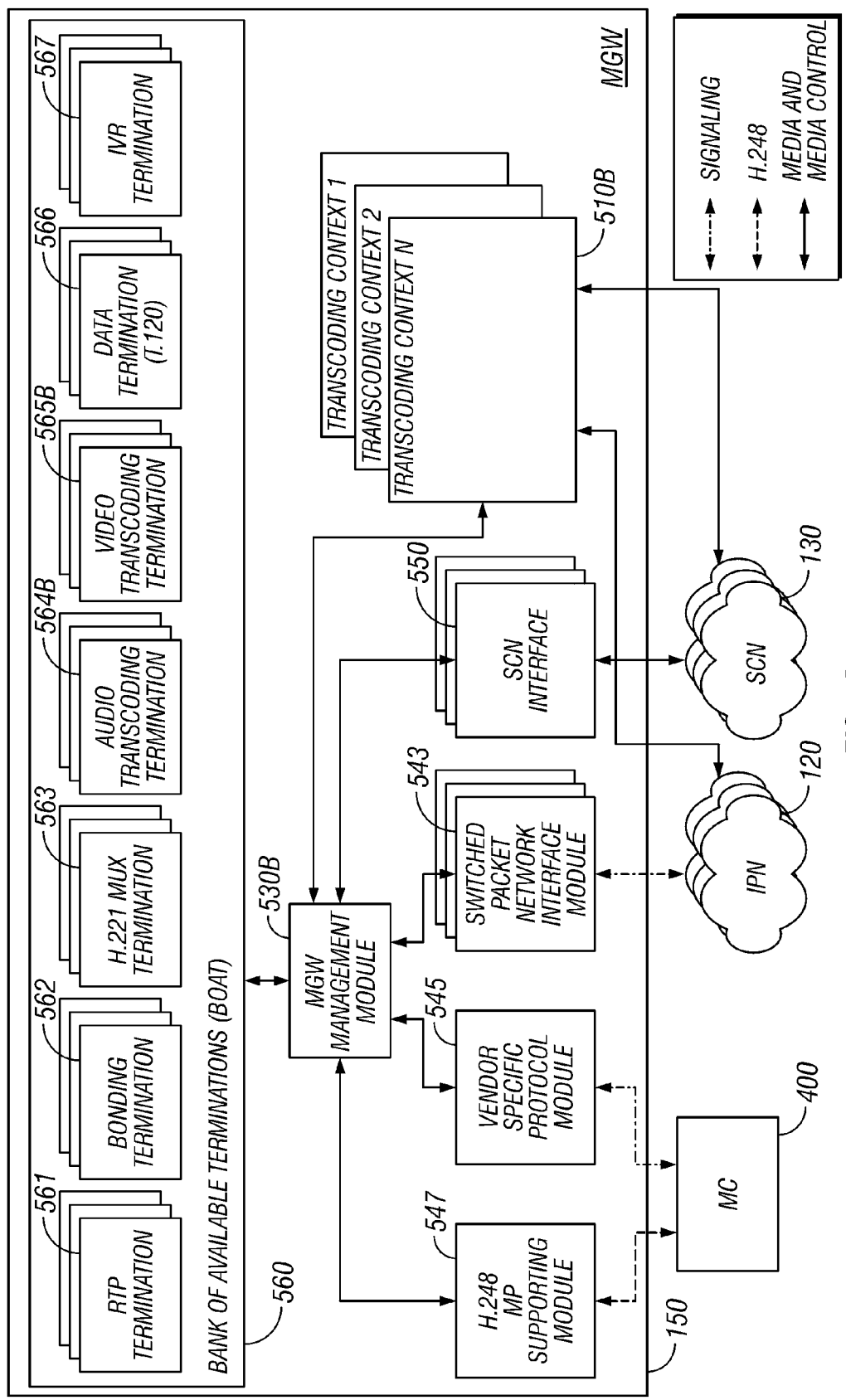
FIG. 5b is a functional block diagram of an exemplary Media Gateway.

FIG. 5b is a functional block diagram of an exemplary MGW 150. MGW 150 has fewer functions than MP 140. MGW 150 cannot compose a video/audio conference; therefore it has neither AMTs 564 nor VMTs 565. Instead, MGW 150 has audio transcoding terminations (ATTs) 564b and video transcoding termination (VTT) 565b. An ATT 564b and VTT 565b have limited functionality compared to AMT 564 and VMT 565. ATT 564b and VTT 565b may conduct a video and/or audio communication between two participants simultaneously who are using equipment having different protocols or parameters, and transcodes the media streams. In this communication, one participant is the client of the conferencing services that is located over a SCN 130 and the other side may be a RRU 170 and GCC 110, during the set-up stage, and the selected MP 140 that conducts the conference, during the conference. In both cases the other side is located over IPN 120.

As shown in FIG. 5b, an exemplary embodiment of the present invention, a functional MGW 150 includes several modules such as, but not limited to, a plurality of Switched Packet Network Interfaces (SPNI) 543 to communicate with end-points that are using SIP or H.323 protocols, a H.248 Module 547, a Vendor Specific Protocol Module 545 to communicate with MC 400, an SCN Interface 550, a plurality of active contexts 510b, and a Bank of Available Terminations (BOAT) 560.

MGW Management Module 530b is similar to MPMM 530, but typically has fewer capabilities. MGW Management Module 530b may only handle the transcoding context 510b between two participants where one is located on IPN 120 and the other is located on SCN 130. Transcoding contexts 1→n 510b may be limited to transcoding only and are described in detail in conjunction with FIG. 6b.

In some embodiments, the IVR termination 567 is required to conduct the conversion of the digital messages to vocal messages that are transferred to the user who has dialed the SDCSN, prompting him to define his needs by using, for example, DTMF and thereafter getting and analyzing his response. The IVR termination 567 may be used in a WCC during the set-up step. However, in another exemplary embodiment of the present invention, which uses the Default MP (DMP) configuration, there is no need to have an IVR termination and WCC in the MGW.

There are several levels of control in managing Multimedia Multipoint Conferences that can be divided between MC 400 and MP 140 or MGW 150 (FIG. 1). For example:
  (1) Interfacing with the client—accept requests, reservations, call set-up, call terminations and reports etc. The MC 400 typically does this type of management. The MP 140 or MGW 150 may be part of this activity as a transport channel between the MC 400 and the customer using IPN 120 as IP trunking
  (2) Resource management—the MC 400 manages the resources of the MP 140 and MGW 150. The MC 400 selects the appropriate MP 140 or MGW 150 and the appropriate type of terminations in the MP 140 or MGW 150 which will be involved in the conference. MC 400 also defines the type of conference and the streams that need to be presented to the customer.
  (3) Context topology management—the MPMM 530 or MGMM 530b receives from MC 400 the resource allocation, the type of the conference and the streams that are presented to the customer. Based on this information the MPMM 530 or MGMM 530b selects the exact physical resources. The MPMM 530 or MGMM 530b creates the terminations and the context according to commands from the MC 400. The VMT 565, the AMT 564, and the DT 566 handle the stream topology. The MPMM 530 or MGMM 530b transmits to the MC 400 the ID number of the selected terminations and status and indications about the ongoing conferences.
  (4) Real time management—the MPMM 530 or MGMM 530b manages the conference context. The MPMM 530 or MGMM 530b creates a Virtual Context Manager (VCM) for each context. The VCM manages the context and receives indications and status from the terminations.

Figure 6A:
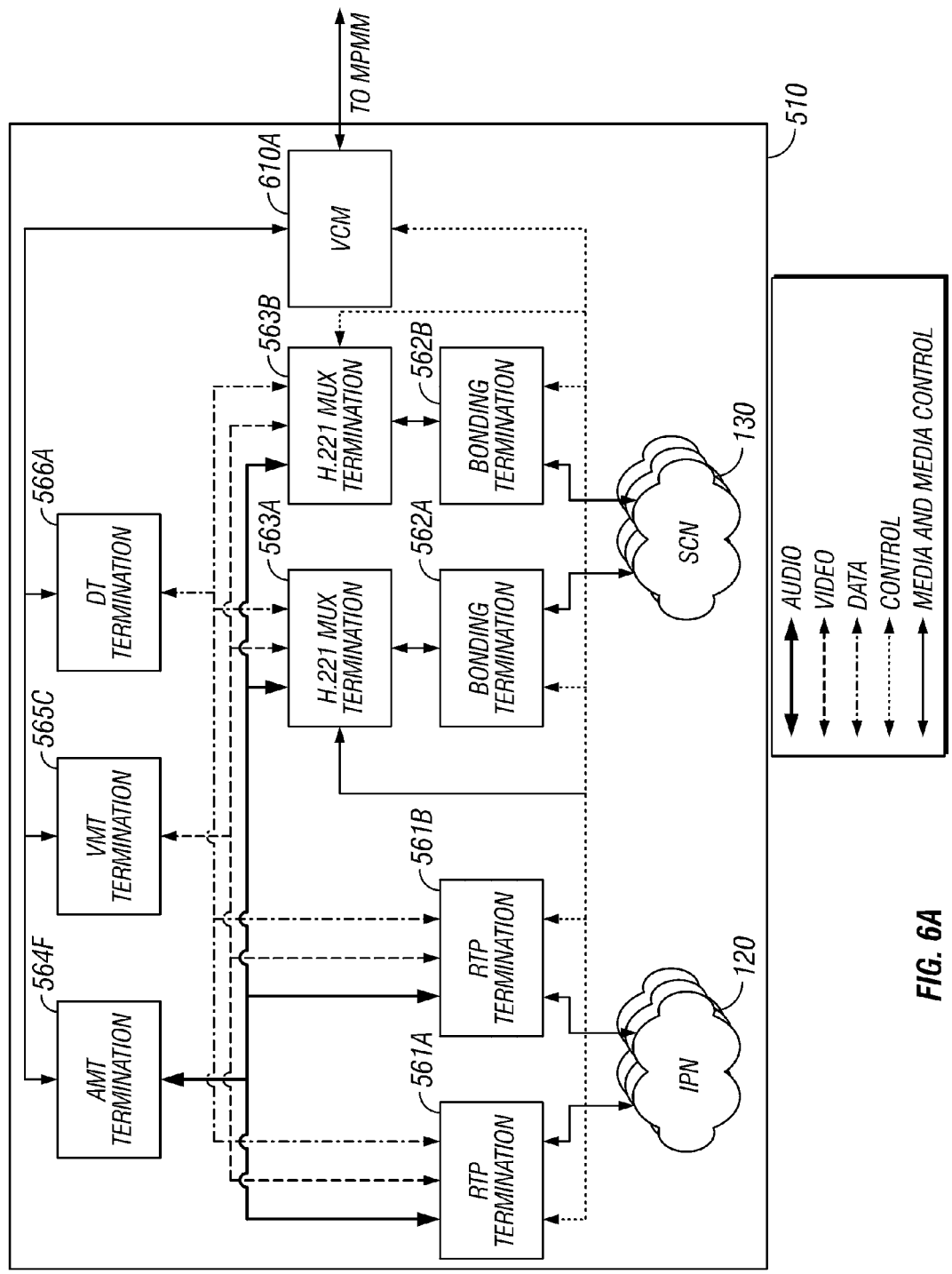
FIG. 6a illustrates an exemplary context of a multimedia conference.

FIG. 6a illustrates an exemplary context of a multimedia conference, active context N 510 (FIG. 5a). The context is an entity that has been created for the period of the conference. The context is initiated by the MC 400 (FIG. 4), constructed by the MPMM 530, and its real time management is done by VCM 610a. At the end of the session MC 400 clears the context and returns the terminations of the context to BOAT 560. As shown, the exemplary context of FIG. 6a represents a conference of four end-points, which are not shown in the drawing. Following are exemplary parameters of the end-points: End-point 1 (EP1) is connected to SCN 130 using H.320 protocol and video compression standard H.261. Endpoint 2 (EP2) is connected to SCN 130 using H.320 protocol and video compression standard H.263. End-point 3 (EP3) is connected to the Internet 120 with SIP protocol and video compression standard H.263. End-point 4 5 (EP4) is connected to the Internet 120 with H.323 protocol and video compression standard H.261. The required properties for the conference in the exemplary embodiment of FIG. 6*a* are that all end-points are video, audio and data end-points, the conference type is video transcoding, and all the participants see the current loudest speaker while the speaker sees the previous one. The video streams are transcoded to accommodate the different end-points.

Based on the above, MC 400 requests MP 140 to create a context. The MP 140, through MPMM 530, selects the following terminations from the BOAT 560 and defines the streams among those terminations: two bonding terminations 562*a* and 562*b*; two H.221 MUX terminations 563 and 563*b*; two RTP terminations 561*a* and 561*b*; an AMT 564*f*; a VMT 565*c*; and a DT 566*a*. The AMT 564*f* is a common audio mixer that can mix the audio of at least three inputs. The AMT 564*f* can analyze its inputs, identify the loudest speaker and send an indication about the identification of the loudest speaker. The VMT 565*c* is a video transcoding unit and can be implemented by common transcoding methods such as using four decoders, four encoders (one channel for each end-point) and a shared video bus. The DT 566*a* can handle data protocols, for example, T.120.

The MPMM 530 defines the topology of the exemplary context as follows: The media stream to and from EP1 is done via bonding termination 562*a* and H.221 MUX 563*a*. From unit 563*a* the audio stream is transferred to the first channel of AMT 564*f*. The video stream is transferred to channel number 1 of VMT 565*c*. The decoder and the encoder of channel 1 are adjusted to fit the needs of EP1. The output of the encoder of channel 1 is transferred to unit 563*a*. The data is transferred to DT 566*a* and the control stream is transferred to VCM 610*a*. The media stream of EP2 uses a similar path but via units 562*b*, 563*b*, the second channel in AMT 564*f* and the second channel of VMT 565*c*, respectively, and the control stream is transferred to VCM 610*a*. The media stream to and from EP3 (not shown) is done via RTP termination 561*a*. From unit 561*a* the audio stream is transferred to the 3rd channel of AMT 564*f*. The video stream is transferred to the 3rd Channel of VMT 565*c*. The decoder and the encoder of channel 3 are adjusted to fit the needs of EP3. The output of the video encoder of channel 3 is transferred to RTP unit 561*a*. The data is transferred to DT 566*f*. The media stream of EP4 uses a similar path but via units 561*b*, the 4th channel in AMT 564*f* and the 4th channel of VMT 565*c* and the DT 566*f*, respectively. The real time management of this conference is done by VCM 610*a*. The VCM 610*a* receives indications from all the units. Among these indications, the VCM 610*a* gets indication from AMT 565*f* identifying the loudest speaker. When the loudest speaker is changed the VCM 610*a* routes the output of the video encoder of the new loudest end-point to the other three end-points while the video to the new loudest speaker remains the same, (the video of the previous speaker). The VCM 610*a* informs MC 400 (FIG. 4), via MPMM 530 (FIG. 5*a*), about replacing the speaker as well as any other changes in the status of the conference. In another scenario the VCM 610*a* only informs MC 400 about the new loudest speaker and the MC instructs the VCM 610*a* to change the video routing. In such an embodiment VCM 610*a* does not change the video routing automatically.

Figure 6B:
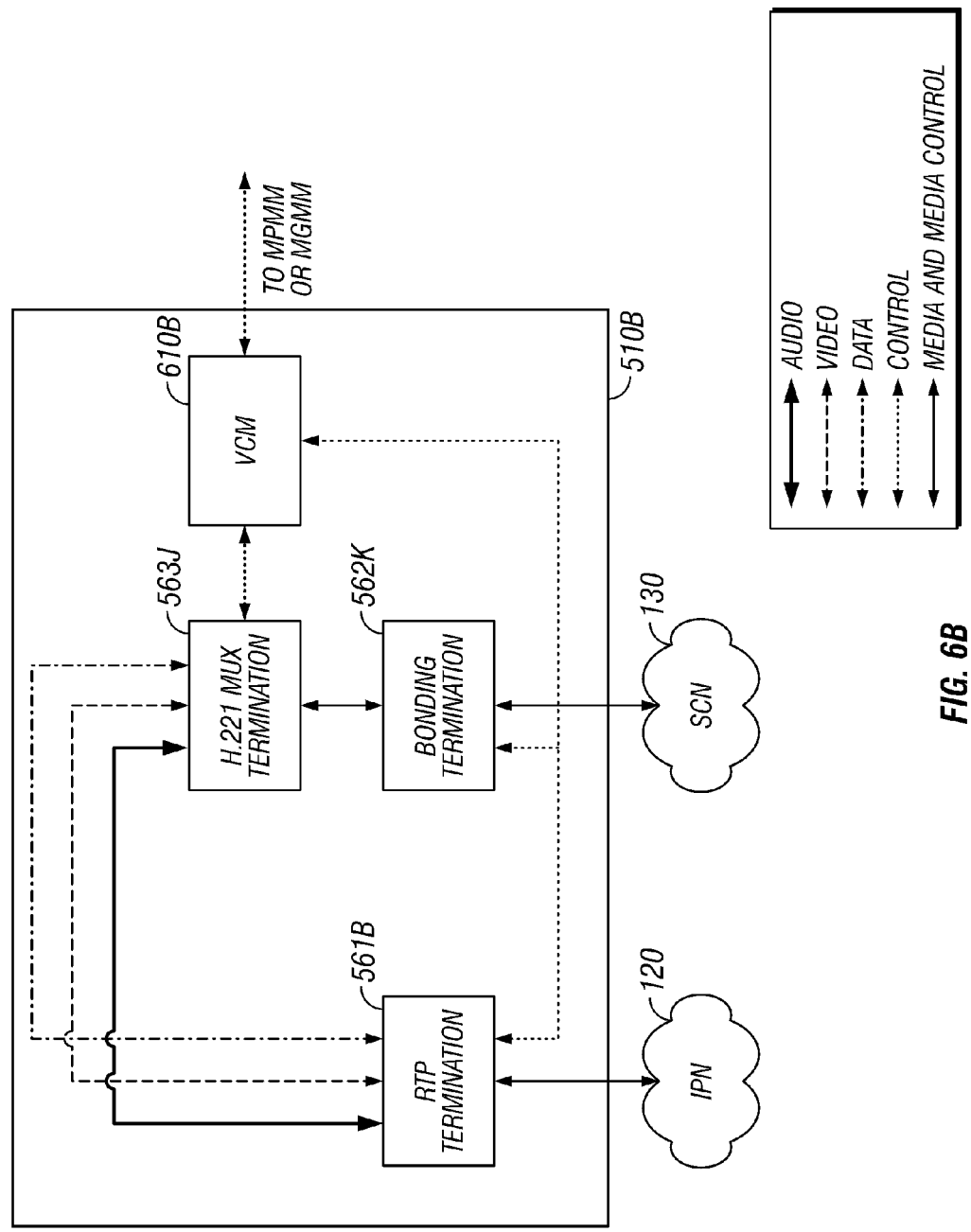
FIG. 6b illustrates an exemplary context of a translating communication.

FIG. 6*b* illustrates an exemplary translating context 510*b*. Translating context 510*b* may be used by MP 140 or MGW 150 to connect an end-point (EP) (not shown in the figures) that is connected over SCN 130 to the selected MP 140 that conducts the conference in which the user of the EP is participating. The connection to the MP is done via IP trunking over IPN 120. The EP may use protocols like H.320, H.321 and H.324 etc. Context 510*b* may include bonding termination 562*k*; H.221 MUX termination 563*j* and RTP termination 561*b*. The context is controlled by VCM 610*b* in communication with MPMM 530 or MGMM 530*b*.

The bonding termination 562*k* aggregates 'N' ISDN 64 kbit channels to one call and transfers the data to H.221 MUX termination 563*j*. MUX termination 563*j* multiplexes/demultiplexes the stream into four streams: media control stream, audio stream, video stream and data stream. The media control stream is transferred via VCM 610*b*, MPMM 530 or MGMM 530*b*, H.248 module 547 or Vendor Specific Protocol Module 545 (FIGS. 5*a* and 5*b*) over IPN 120 to GCC 110 (FIG. 1). The audio, video and the data streams are transferred to RTP termination 561*b*. RTP termination 561*b* parses the three types of media streams into packets and sends the packets using IP trunking over IPN 120 to the selected MP 140, which handles the conference. Media packets from the selected MP and control packets from GCC 110 to the EP are transferred using IP trunking via IPN 120 to the EP in the reverse way that has been described above.

Figure 6C:
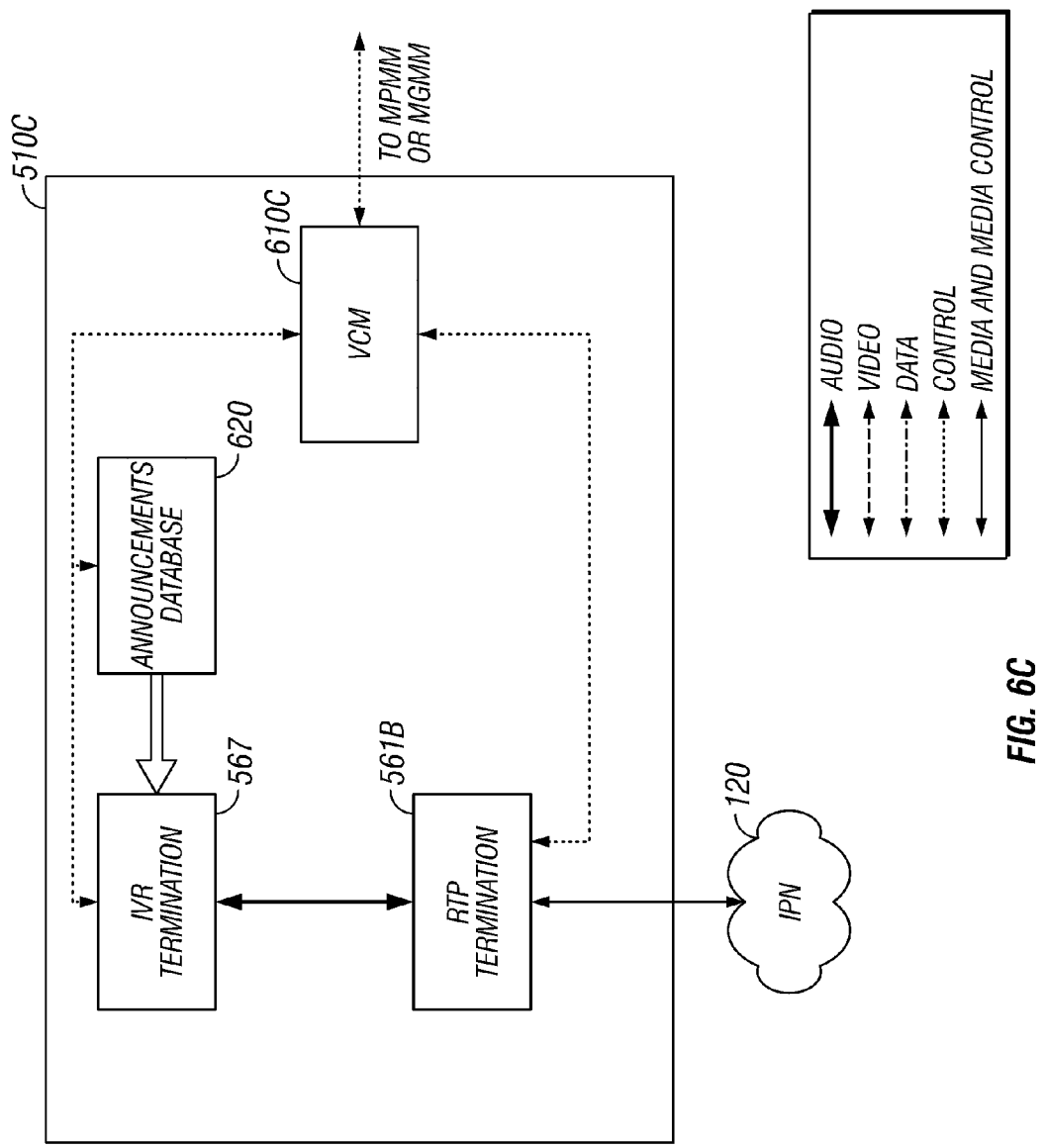
FIG. 6c illustrates an exemplary welcome context in a Default Media Processor.

FIG. 6*c* illustrates an exemplary welcome context. The welcome context 510*c* may be used by the DMP when responding to new dial-in call of SDCSN. The signaling of the new call is transferred by RRU 170 to MC 400. MC 400 routes the call to the DMP and generates the welcome context 510*c* that interacts with the user. Context 510*c* may comprise RTP termination 561*b*, IVR termination 567, announcements database 620 and VCM 610*c*. IVR termination 567 may include audio decoder, encoder and DTMF decoder Announcements database 620 stores the audio messages that are required to construct the various vocal messages. VCM 610*c* in communication with MC 400 manages the IVR session. VCM 610*c* instructs the announcement database 620 to retrieve the appropriate message and to transfer it to IVR 567. IVR 567 composes the vocal message and encodes it according to the needs of the EP, and transfers the audio stream to RTP 561*b*, which parses the stream into packets and transmits the audio packet via IP 120. The messages are transferred directly to IP terminals, 175 and 180, or via MGW 150 or other MP 140 to SCN terminals 160 and 165. In the other direction, RTP 561*b* receives audio packets of the user's response, parses the packets into a compressed (encoded) audio stream and transfers the stream to the IVR termination 567. IVR termination 567 decodes the DTMF signals and transfers the data to VCM 610*c*. In this description, words such as 'compress' and 'encode' may have the same meaning.

Figure 6D:
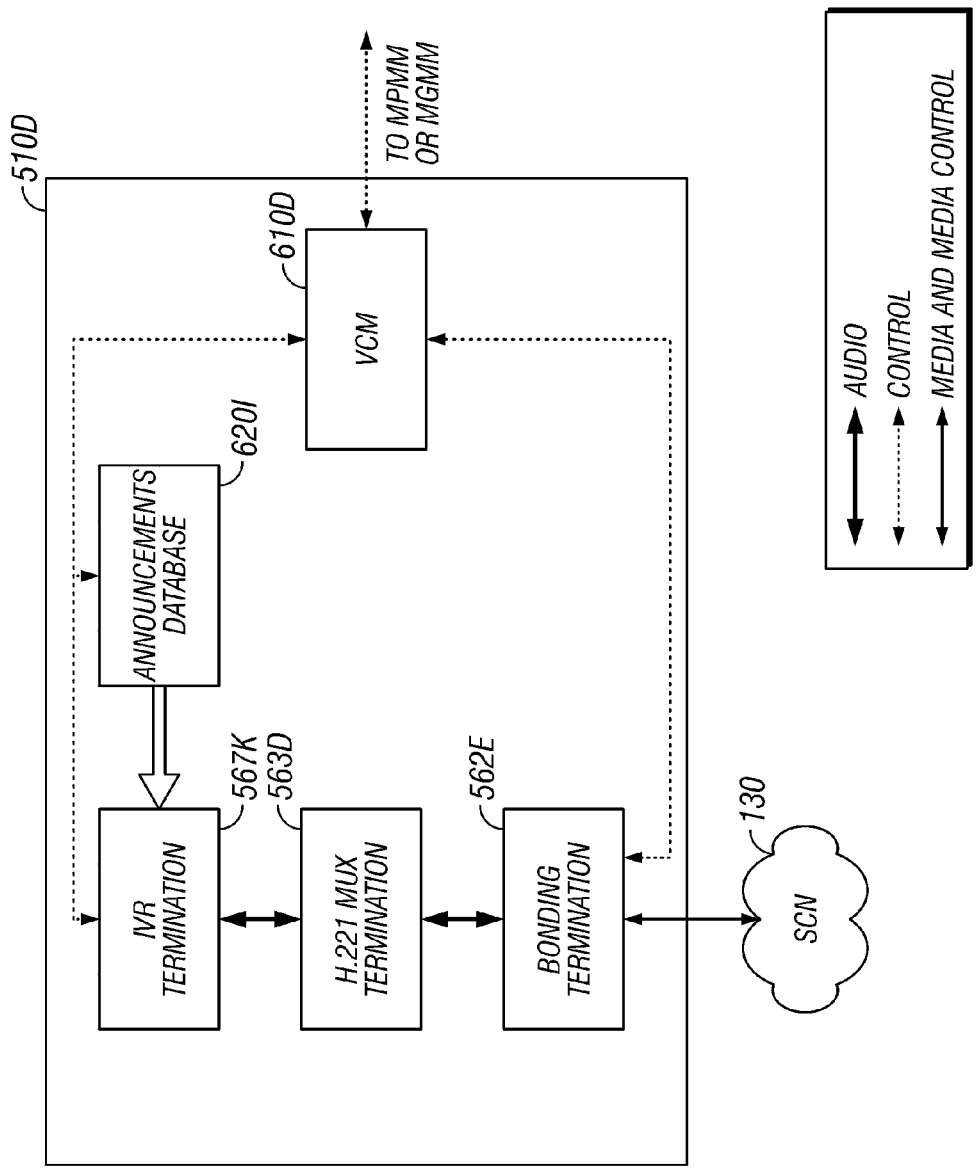
FIG. 6d illustrates an exemplary multimedia welcome context.

As shown in FIG. 6*d*, other exemplary embodiments of conferencing system 100 (FIG. 1) do not use the DMP option. Instead, each one of the MPs 140 and MGW 150 may run the IVR session using its own welcome context 510*d*. This welcome context requires additional terminations to communicate over SCN 130. Upon receiving a new dial-in call from a H.320 user that is connected over SCN 130, the appropriate MP 140 or MGW 150, which is located in the local network at the POP, responds to this call by initiating a context 510*d*. Context 510*d* may include bonding termination 562*e*; H.221 MUX termination 563*d*, IVR termination 567*k* (FIG. 5), and Announcements Database 620*i*. The context is controlled by VCM 610*d* in communication with MPMM 530 or MGMM 530*b*. The operation of this context is similar to the operation of context 510*c*, but here the audio of the IVR session is not transferred over IPN 120 but is translated into H.320 inside the context.

Figure 6E:
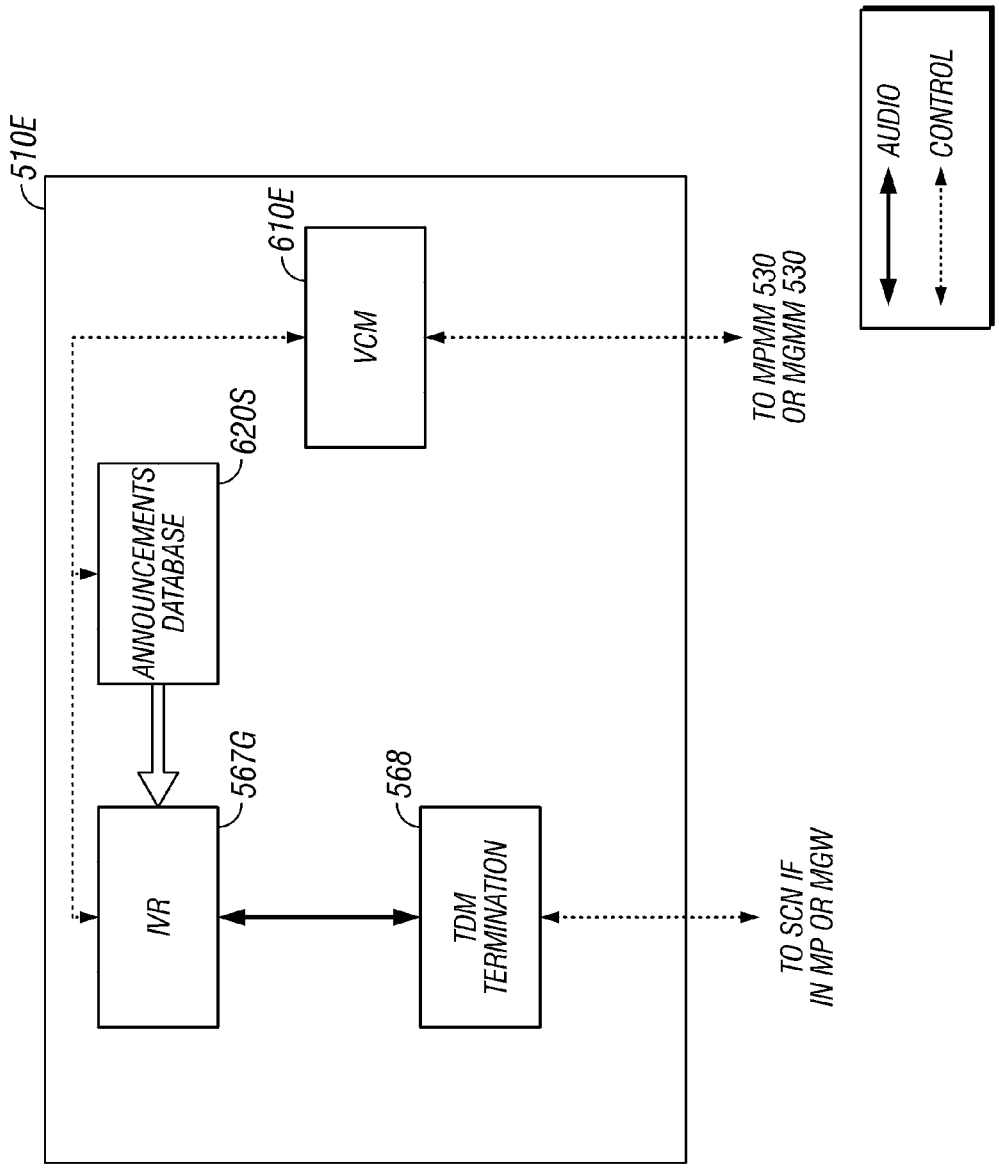
FIG. 6e illustrates an exemplary phone welcome context.

FIG. 6e illustrates an exemplary phone welcome context 510e that may be used to interact with a user of phone 160 (analog, digital or cellular) that is connected over SCN 130 (FIGS. 1 and 2). Upon receiving a new dial-in call from a phone, the SCN interface logical module of the appropriate MP 140 or MGW 150, which is located in the local network at the POP of the service provider, responds to this call. SCN interface logical module 550 (FIGS. 5a and 5b) represents Layer 3 of the Switch Circuit Network Protocol (SCNP) and communicates with the appropriate MPMM 530 or MGMM 530b (FIGS. 5a and 5b). The MPMM 530 or MGMM 530b initiates a "Phone Welcome Context" 510e. Context 510e may include IVR termination 567g, announcements database 620s, and a TDM termination 568. TDM termination 568 represents the time slot in T1, E1, or PRI trunks in SCN 130. The context is controlled by VCM 610e in communication with MPMM 530 or MGMM 530b. The operation of this context is similar to the operation of context 510d but here the encoded audio of the IVR session is sent to the user via SCN Interface as is.

Figure 7:
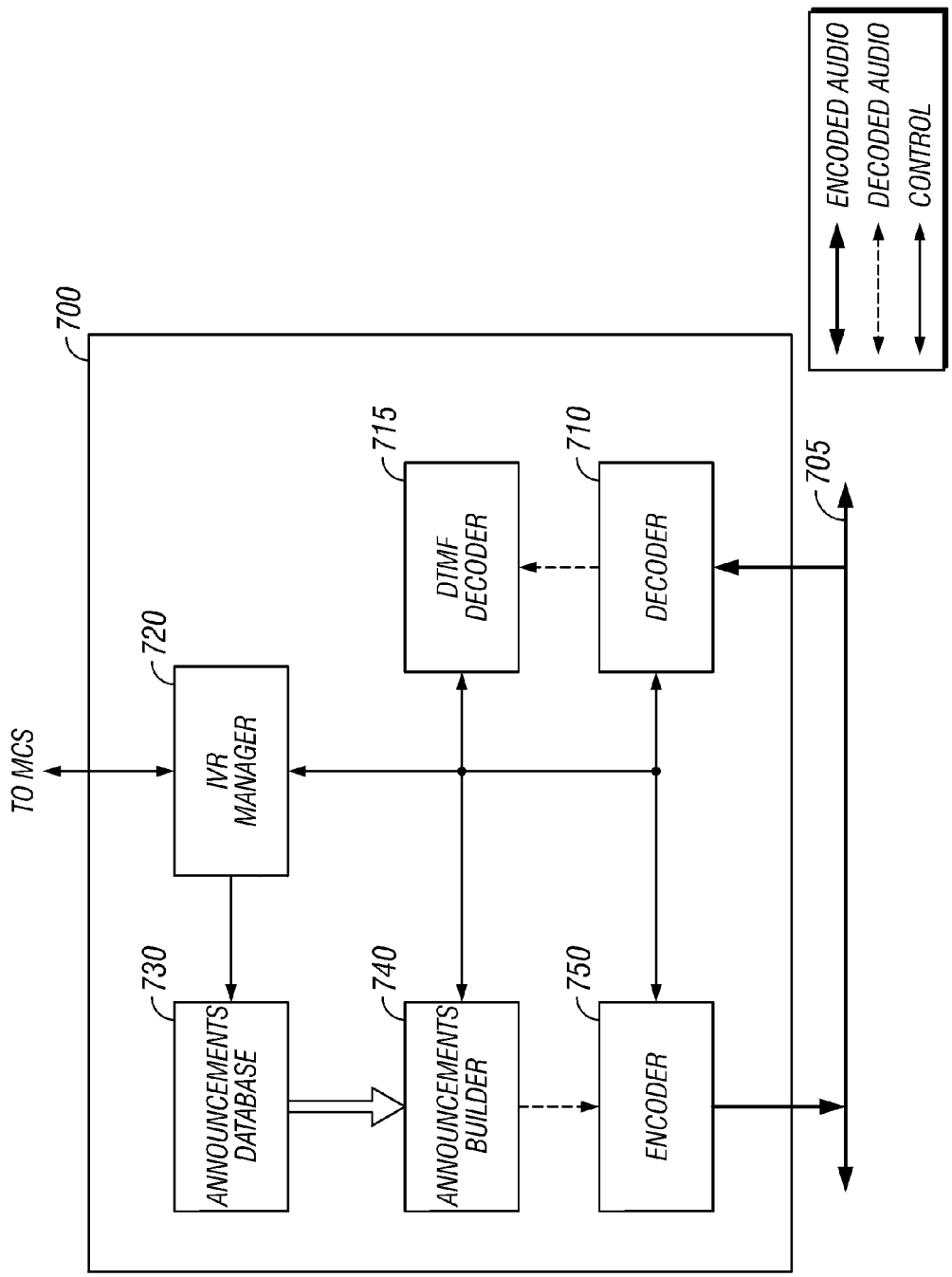
FIG. 7 illustrates a block diagram of an exemplary Interactive Voice Response logical module in a common Media Control Unit or Gateway.

Referring now to FIG. 7, the welcome session in the exemplary audio and/or multimedia conferencing system 200 (FIG. 2), in which the GCC 210 of system 200 is implemented by MCU and common MCUs 240a-n and GWs 250, is handled by IVR logical module 700. IVR logical module 700 is added to the audio unit of the default MCU and is connected to the Compressed Audio Common Interface that carries the compressed audio between the different audio modules and the network interface modules, which are not shown in the drawings. As shown, IVR logical module 700 may comprise audio decoder 710, DTMF decoder 715, IVR manager 720, announcements database 730, announcements builder 740 and audio encoder 750. Decoder 710 grabs the compressed audio of the appropriate end-point from the compressed audio common interface 705, decodes it and transfers the decoded audio to DTMF decoder 715. The DTMF decoder 715 filters the DTMF signals, processes them and transfers the digit information to IVR manager 720. IVR manager 720 instructs the decoder 710 as to which data to grab from the compressed audio common interface 705. The compressed audio common interface 705 may be a TDM bus. IVR manager 720 processes the data from DTMF decoder 715, and may communicate it to the MCS (not shown) of the MCU. Based on the user's response and the session flow, IVR manager 720 retrieves the appropriate announcement from announcements database 730 and transfers it to announcements builder 740. Announcements builder 740 composes the vocal message. Then IVR manager instructs encoder 750 to encode the vocal message according to the needs of the EP and to place the encoded audio stream over common interface 705. Additional information about the operation of the IVR manager is disclosed below in conjunction with the flow charts of FIGS. 8-10. Encoded (compressed) audio announcements are transferred via common interface 705 to the appropriate network interface (not shown) of the MCU. Network interface (not shown) parses the encoded stream into packets and transmits the audio packet via IP 120. The messages are transferred directly to IP terminals, 175 and 180, or via GW 250 or other MCU 240 to SCN terminals 160 and 165. In the other direction the network interface (not shown) receives the audio packets of the user's response, parses the packets into compressed audio stream and transferred the stream over common interface 705.

In an exemplary embodiment of system 200 (FIG. 2), the IVR sessions are handled by one of the MCUs 240, which is selected as the Default MCU 240. Other exemplary embodiments of system 200 may run the IVR session from each one of the GW 250 or MCUs 240 that are located at the POP of the service provider close to the user. In such embodiments, IVR logical module 700 resides in each one of the MCUs 240 and GW 250. IVR manager 720 in communication with the Management and Control System (MCS) (not shown in the drawings) section of an MCU 240 or GW 250 and the GCC 210 (a VMCU) (FIG. 2) manages the IVR session. Based on the IVR session, the GCC 210 (FIG. 2) instructs the MCU 240 or GW 250, which is located in the POP, as to which MCU to route the call. System 200 (FIG. 2) may handle a plurality of IVR sessions simultaneously. Some embodiments may create an IVR logical module 700 for each session. In other embodiments the IVR logical module 700 may handle a plurality of IVR sessions simultaneously.

When a user requests conference services from a service provider, the user dials the Single-Dial Conference Service Number (SDCSN) of the service provider. The response to this call is provided by MGW 150 or a MP 140 in case of system 100 (FIG. 1) or the GW 250 or the MCU 240 in the case of system 200 (FIG. 2), which is located in the POP of the service provider in the appropriate network 130 or 120 (FIGS. 1 and 2). The call may be routed, using IP trunking over IPN 120, to the Default MP 140 or MCU 240 that has been appointed as the destination address for carrying the welcome session. Where the user is connected over SCN 130, the responding unit in the POP also translates the signaling into SIP or H.323 protocol. In other exemplary embodiments, the welcome session may be provided by the local MP/MCU 140/240 or MGW/GW 150/250 that receives the call. Other exemplary embodiments may use a text-to-speech module as part of the IVR Module. In this type of unit, the announcement may be entered and saved in an announcement database as a text announcement.

Figure 8:
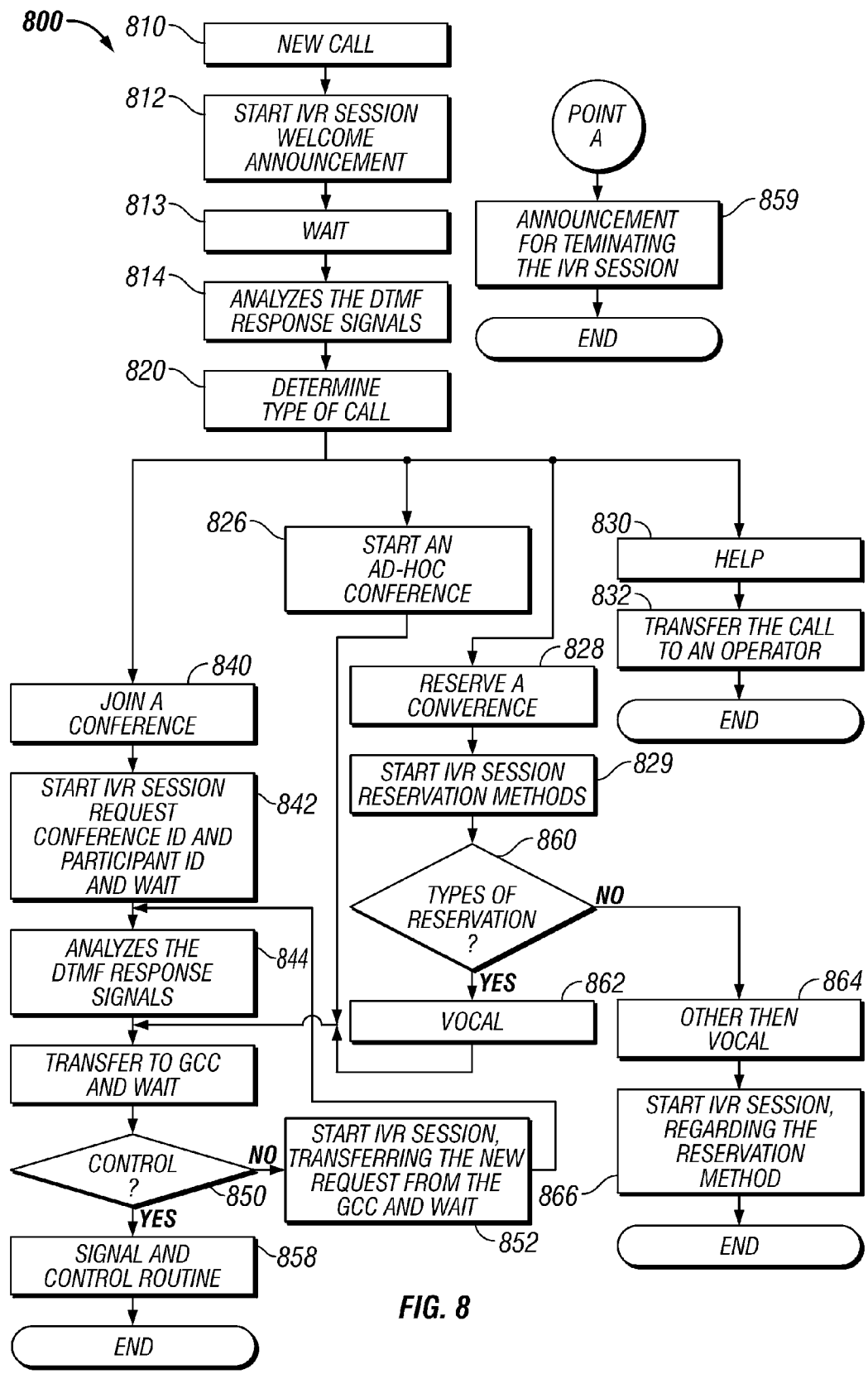
FIG. 8 illustrates a flowchart of an exemplary welcome session that may be used by the unit providing Interactive Voice Response functionality.

FIG. 8 illustrates an exemplary welcome session flow. Upon receiving a new call 810, the unit (MP/MGW 140/240, or MCU/GW 150/250, FIG. 1 or 2, respectively) that performs the welcome session starts an IVR session 812 and creates a welcome announcement. The IVR session runs on an IVR module. In the case of a decomposed architecture (FIG. 1), the IVR module may be a welcome context (510 to 510e in FIGS. 6a to 6e). In the case of a VMCU architecture (FIG. 2), the IVR module may be the IVR logical module 700 (FIG. 7). An exemplary welcome announcement may be "Thank you for using Polycom services. If you wish to join a conference please press '1'. If you wish to start an ad-hoc conference please press '3'. If you wish to reserve a conference press '4'. If you need an operator assistance please press '*' at any time." The announcement is compressed and sent to the end-point while the process 800 waits 813 for the user's response.

Upon receiving the user's response, the response is analyzed 814 by the DTMF decoder 715 (FIG. 7), or IVR termination 567 in a Decomposed architecture, and the digit of the pressed key is transferred to IVR manager 720 or VCM termination 610 in the Decomposed architecture of FIG. 6c. Based on the response, the system determines 820 which type of services has been requested. When it is determined that the user pressed the '*' key, indicating that operator's help 830 is needed, the system transfers the call to an operator 832. The operator may reside at the POP or the call may be routed over IPN 120 to a remote operator at the service provider premises, or other location.

When it is determined that the user pressed the '1' key, requesting to join a conference 840, method 800 moves to step 842 and starts another IVR session. During the new IVR session the method may request the conference ID number and the participant's (private) ID number. The vocal announcement may be "Press your ID number following by the '#' key and then press your private ID number following by the second '#' key." After the announcement, the system 800 waits for the user's response. At this point, an interactive loop including the user, the GCC 110 or 210 (FIG. 1 or 2), and the device that is handling the IVR session, which may be either the MP/MGW (140/150, FIG. 1) or MCU/GW (240/250 FIG. 2), is started. The IVR module acts as the interface to the user and uses IP trunking over IPN 120 as the communication channel between the MP/MGW (140/150 FIG. 1) or MCU/GW (240/250 FIG. 2) and the GCC 110 or 210 (FIG. 1 or 2). Upon receiving the DTMF signals from the user, IVR module analyzes 844 them and converts the DTMF signals into digit information. Then IVR module transfers 848 the information based on the response of the user to GCC 110 or 210 and waits for the next instruction from the GCC. An exemplary method of the IVR session performed by GCC 110 or 210 is described below in conjunction to FIG. 9.

Upon receiving the next instruction from the GCC, method 800 determines 850 whether the instruction is a signaling and control instruction or another interaction with the user. If it is a signaling and control instruction, the method performs the signaling and control routine according to the type of the instruction 858. For example, in the case of a routing instruction to the selected MP/MCU that will handle the conference, the IVR logical module 700 transfers this instruction to the MCS, or the MC unit in a Decomposed architecture, of the unit at the POP that handles the call, subsequently the IVR logical module 700 terminates the IVR session. The unit at the POP routes the call to the selected MP 140 (FIG. 1) or MCU 240 (FIG. 2) over IPN 120 (FIGS. 1 and 2) using IP trunking. Another signaling and control example may be the rejection of the call due to lack of resources or wrong ID numbers, etc. The IVR module may create and send to the user a terminating vocal announcement that explains the rejection. Then IVR module instructs the MCS or the MC unit in a Decomposed architecture, of the unit in the POP to disconnect the call and terminate the IVR session.

If the instruction from the GCC 110 or 210 is not a signaling and control instruction but a new interaction cycle with the user 850, IVR logical module starts a new IVR session generating a new vocal announcement that represents the new request, sends it to the user and waits for the user's response 852. Upon receiving the response, the method 800 returns to step 844.

If IVR Module determines at step 820 that the type of the call is a request for ad-hoc conference services 826, the IVR module moves to step 848 and transfers the request for the ad-hoc conference to GCC 110 or 210 (FIG. 1 or FIG. 2).

If IVR Module determines at step 820 that the type of call is a request for reservation services 828, the IVR module starts a new IVR session generating a new vocal announcement that represents several reservation methods, sends it to the user and waits to the user's response 829. An exemplary vocal announcement may be "Please select the reservation method that fits your need. By email please press '1'. By fax please press '2'. For vocal reservation please press '3'. For operator assistance please press '*' at any time". Upon receiving the response, method 800 analyzes the response and determines whether the user selected a vocal method 860. If yes 862, the request is transferred to GCC 110 or 210 and moves to step 848. If a vocal command was not selected 864, the method may start several IVR sessions according to the selection of the user 866. For example, if the user selects the fax option by pressing '2' the IVR may request his fax number, and then terminate the call. Later the MCS (not shown) at the POP sends a FAX to the user's number with the reservation form and instructions on how to fill it out.

Methods in accordance with FIG. 8 may run a timer while waiting for the user's response. The timer is initiated at the end of the IVR session, step 852, and is stopped upon receiving a DTMF signal from the user. When the timer expires before receiving a DTMF signal, method 800 may announce that if during the next few seconds none of the keys are pressed, the call will be terminated. Other exemplary methods may use other routines to avoid infinite waiting.

Figure 9:
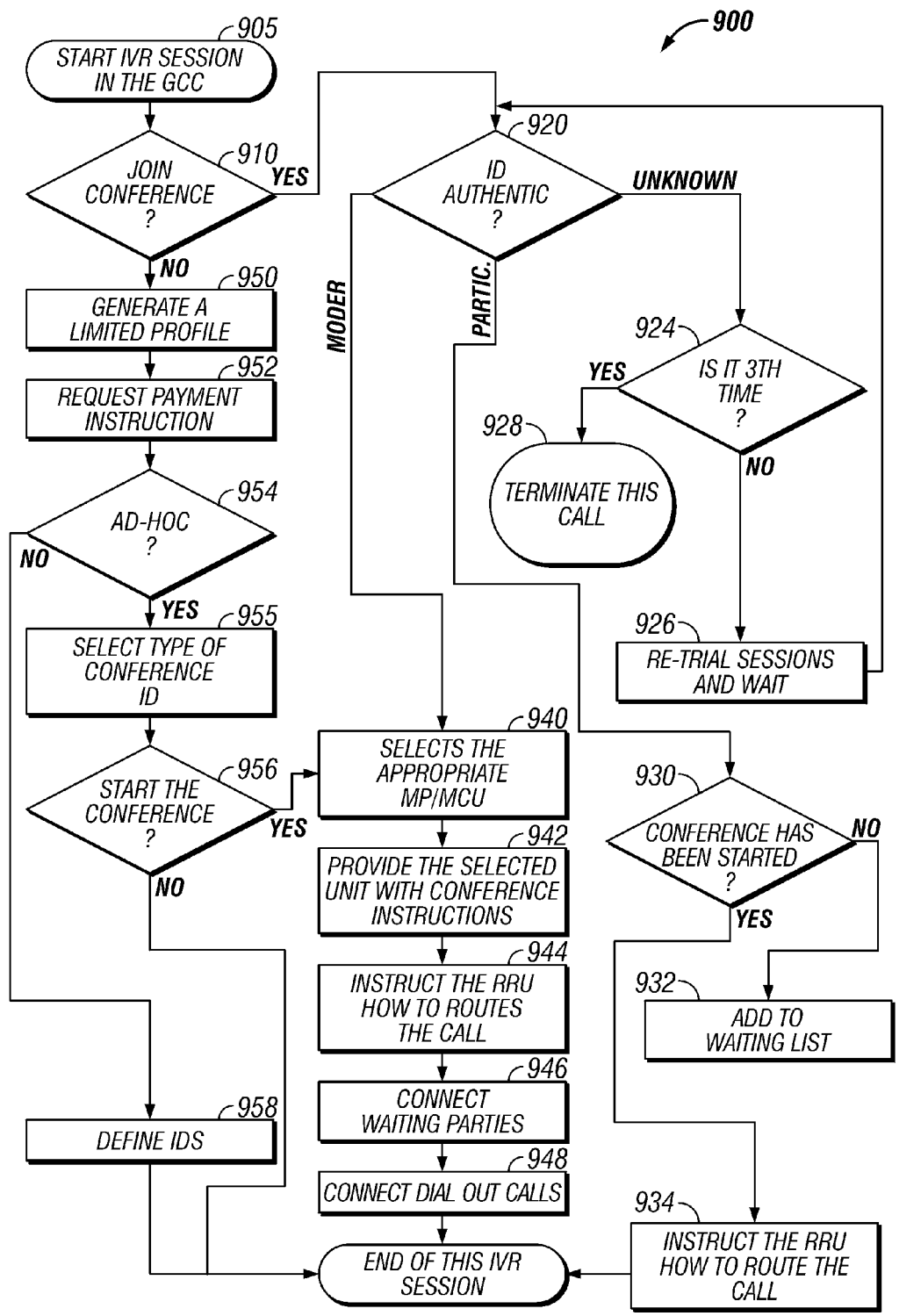
FIG. 9 illustrates a flowchart of an exemplary method that may be used by a General Conference Controller while performing its role in an Interactive Voice Response session.

FIG. 9 illustrates an exemplary method that may be used by a GCC 110 or 210 (FIG. 1 or 2) while performing its role in the IVR session. The initiation of method 900 starts 905 upon receiving IVR data from the unit that runs the IVR session. The unit that runs the IVR session may be the default MP 140 or MCU 240 (FIG. 1 or 2) that has been selected by the GCC as the destination address for all in coming calls of the SDCSN. In other embodiments, the unit that runs the IVR session may be any MP/MGW 140/150 or MCU/GW 240/250 (FIG. 1 or 2), which is located at the POP of the service provider in networks 120/130. This unit responds to the calls that use the SDCSN. Upon receiving the first IVR data from the IVR module (step 848 in FIG. 8) method 900 is initiated 905 and checks whether the IVR data is a request to join a conference 910. If not, the GCC 110 or 210 moves to step 950. If yes, the system moves to step 920 and authenticates the conference ID number and the private ID number. Those numbers are incorporated into the IVR data that has been received from the units that run the current session. If the ID numbers are unknown, method 900 checks to determine whether it is the 3rd trial 924. If yes, GCC 110/210 instructs the IVR module, in the units that runs the IVR session, to terminate the call 928. The termination of the call may be associated with an appropriate announcement. For example "Your call can not be served." Other embodiments may use other numbers of trials or other announcements. Methods in accordance with FIGS. 8 and 9 may be ended at this point.

If in step 924 it is not the 3rd time, GCC 110 or 210 may request the IVR module to create a new IVR session for requesting the user to enter his ID numbers again 926. The method waits for the response. This request renews the operation of the IVR module from step 850 in FIG. 8 while the GCC 110 or 210 waits for the user response. Upon receiving the response, method 900 renews its operation from step 920.

If GCC 110 or 210 identifies the conference ID number and the private ID number, it determines in step 920 whether the user is a common participant or the moderator of the conference. If the user is a common participant GCC determines whether the conference has been started 930. If yes, GCC 110/210 (FIGS. 1 and 2) gives a routing instruction to RRU 170 and to the unit at the POP in step 934, which handles the connection with the user (in the case that the user is connected over SCN 130), how to route the call to the MP/MCU 140/240 that manages the conference using IPN 120 as IP trunking for the call. At this point method 900 is ended. The routing instruction renews the operation of method 800 at step 850.

If in step 930 the conference has not started yet, GCC 110/210 adds the new participant to the waiting list waiting for the conference to be started 932. In parallel, the GCC 110 or 210 instructs the IVR module to send an announcement to the user. The announcement may be "Your conference has not started yet, please wait." This instruction renews the operation of method 800 at point A/step 859. In step 859 of FIG. 8, the unit that runs the IVR session terminates the IVR session.

If in step 920 the user is determined to be the moderator of the conference (based on the conference's profile), the GCC selects the most suitable MP/MCU for managing the conference 940. The selected MP/MCU may be different than the MP/MCU that had been assigned to the conference during the reservation stage of the conference. The conference profile is a data structure that may comprise information about the resources needed for the conference. For example, the number of participants, type of end-points, compression standards bit rates, etc. More information about conference profiles can be found in U.S. patent applications Nos. 09/790,577 and 09/852,438. If a profile does not exist, the GCC 110 or 210 may select an MCU that has the largest number of free resources. Other criteria for selecting the MCU can be found in U.S. patent application Ser. No. 09/708,898.

At step 942 the GCC 110 or 210 provides the selected MP/MCU with the parameters of the conference over IPN 120. The parameters may include also the list of the "dial-out" participants. A "dial-out" participant is a participant that the selected MCU has to call for connecting it to the conference. The GCC 110 or 210, in step 944, instructs the RRU 170 and the unit at the POP how to route the dial-in calls to the selected MP/MCU using IP trunking over IPN 120. In step 946, the GCC checks the waiting list for the conference (see step 932). For each waiting participant, GCC 110/210 (FIGS. 1 and 2) gives routing instructions to RRU 170 and the unit at the POP of the network of this waiting participant, how to route the call to the selected MP/MCU 140/240 that manages the conference. The call is routed over IPN 120 using IP trunking. In step 948, the GCC 110 or 210 checks the list of the dial-out participants for the conference. For each dial-out participant, GCC 110/210 (FIGS. 1 and 2) gives routing instructions to RRU 170 and the unit at the POP of the network of the waiting participant on how to route the call to the selected MP/MCU 140/240 that manages the conference. Moreover, GCC 110 or 210 instructs the POP unit to dial to the appropriate dial-out participant. Routing the calls between the selected MP/MCU 140/240 (FIGS. 1 and 2), which manages the conference, and the different POPs is done over IPN 120 as IP trunking for the calls. At the end of the list, GCC terminates method 900.

If, in step 910, the request is not to join a conference, it may be a request a vocal reservation service or to start an ad-hoc conference. In this case the GCC creates a limited profile for the conference 950. GCC 110/210 may instruct the IVR module to request the number of participants. This instruction renews the operation of method 800 at step 850 (FIG. 8). The IVR module may generate an exemplary announcement "Please enter the number of participants having audio terminal, at the end press '#'." The GCC may then wait for the response of the user. The number of multimedia end points may be requested in a similar fashion. Upon receiving the number of participants according to the capabilities of their end-points, the GCC may determine whether there are enough resources to handle this call. If there are not enough resources, GCC 110/210 instructs the IVR logical module 700 in the unit that runs the IVR session to terminate the call with the appropriate announcement. This instruction renews the operation of method 800 at point A/step 859 in FIG. 8. The IVR module may generate a disconnection announcement such as, for example "Your call can not be served since all the resources are busy" and terminates the IVR session (routine 800). At this point the GCC 110 or 210 also terminates the IVR method 900.

If there are enough resources to support the call, the GCC may request payment instruction 952. For example the credit card number of the user. The dialogue with the user is done as described above via IVR module and method 800. Other payment method may be used, for example billing the call to each participant via his communication service provider, or using a credit account or pre-paid account of the user at the conference service provider etc. Upon receiving the payment instructions, the GCC 110 or 210 determines at step 954 whether the call is for an ad-hoc conference. If not, it moves to step 958. If yes, it may request, at step 955, for the user to define the ID number for the conference, which may be valid for a short period of time. The short period may be 10, 15, 30 minutes etc. If there is no other conference that use this ID number, the GCC confirms the request for the ad-hoc conference and moves to step 956. If there is another conference that uses this ID, the GCC may request another ID number from the user. This method enables the user to define in advance the ID number and communicate it to the other participants while coordinating the call. Other options for an ad-hoc call may use dial-out method. In such a case, the GCC, via the IVR module, will request the user enter the dial numbers of the participants. Later, the GCC submits the list of the dial-out participants to the selected MP/MCU. In step 956, GCC 110/210 asks the user, via IVR logical module 700, whether he would like to start the conference. If yes, the method moves to step 940. If not, GCC 110/210 terminates the call as well as method 900. The dialogue with the user is done as described above via IVR logical module 700 and method 800. In step 958 the GCC 110 or 210 defines the ID number of the conference and the participant's ID number, if needed, transfers those IDs to the user using the IVR session and then the method is terminated.

Figure 10:
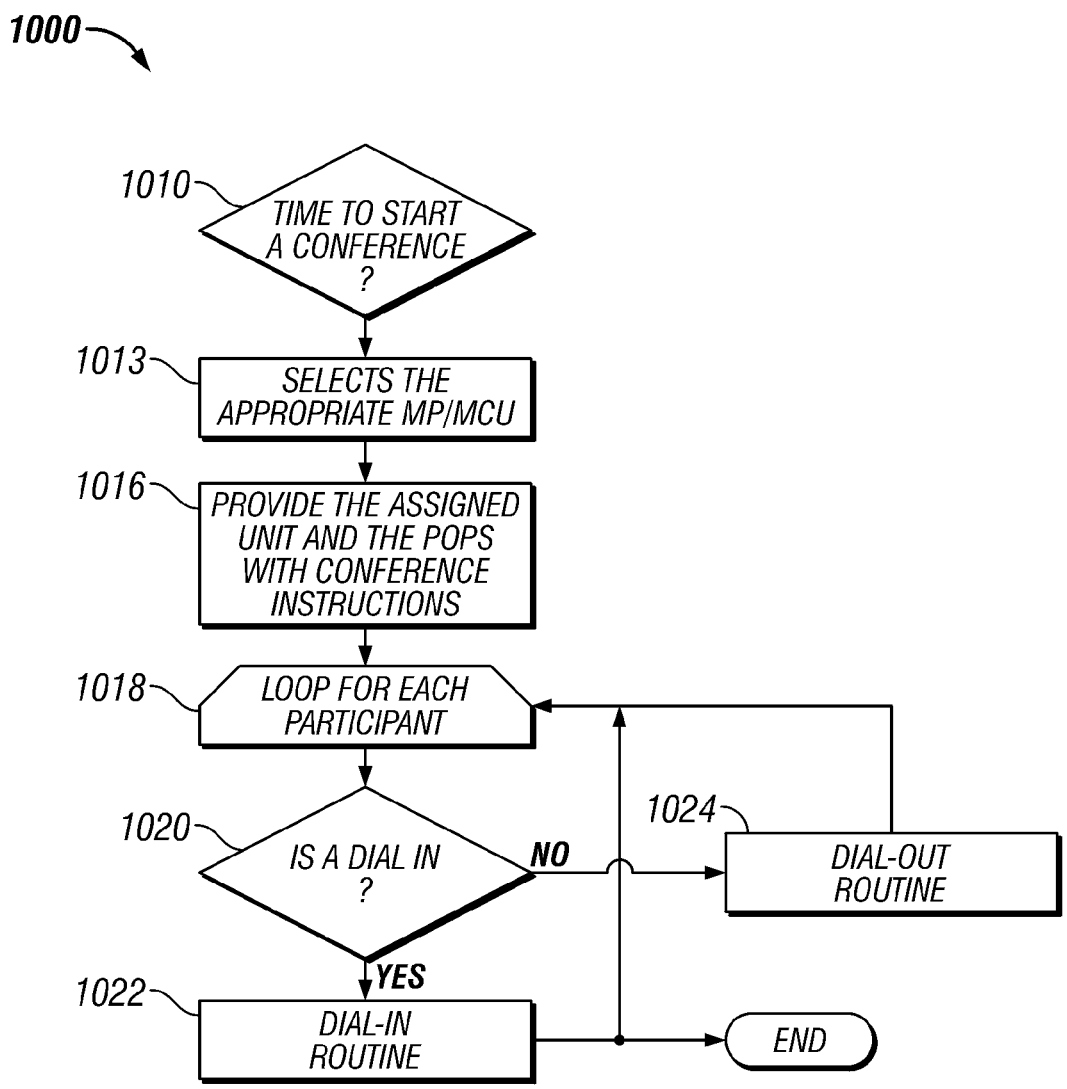
FIG. 10 illustrates a flowchart of an exemplary method that may be used by a General Conference Controller during reserved conference set-up operations.

FIG. 10 illustrates an exemplary method that may be used by GCC 210 (FIG. 2), which is based on the VMCU architecture, while setting up a reserved conference. Method 1000 may start at step 1010 when the time to start a reserved conference has arrived. GCC 210 processes the reserved profile of this conference and determines at step 1013 which one of the MCUs 240 is to manage the conference. The selected MCU 240 may be different from the reserved one, since the reserved one may be busy or down during the time of the conference. Following selection, the GCC 210 registers the conference alias at RRU 170. Usually the time of starting the conference is later than the time that it was reserved. GCC 210 provides at step 1016 the selected MCU 240 with the appropriate information regarding the participants. The information is based on the conference profile and may have the conference ID, type of end-points, dialing parameters of the dial-out participants etc. Then the GCC 210 checks at step 1018 the list of the participants and determines at step 1020 whether the participant is a dial-in participant. If yes, GCC 210 starts the dial-in routine at step 1022 and checks whether the participant is connected directly to an IP network using end-points 175 or 180 (FIG. 2). If the dial-in participant is connecting through SCN 130 using end-points 160 or 165, GCC 210 appoints the appropriate GW or MCU 250 or 240 that is connected at the POP of said participant and instructs the appointed MCU/GW 250/240 about the conference and the selected MCU 240 that manages the conference. The communication between GCC 210 and the various units may be done via IPN 120. In accordance with step 1018, GCC 210 repeats the steps of 1020 and 1022 for each additional dial-in participant. After all dial-in participants have been processed in accordance with steps 1020 and 1022, method 1000 is terminated.

If at step 1020 the current participant is a dial-out participant, GCC 210 (FIG. 2) starts the dial-out routine at step 1024 and checks whether the participant is connected directly to IP network using end-points 175 or 180 (FIG. 2). If yes, GCC 210 instructs the selected MCU 250 that runs the conference to dial-out to this participant. If the dial-out participant is connecting through SCN 130 using end-points 160 or 165, GCC 210 appoints the appropriate GW or MCU (250 or 240)

that is connected at the POP of said participants, registers the appointed MCU/GW alias at RRU 170, and instructs the appointed MCU/GW 240/250 about the conference and the selected MCU 240 that manages the conference. Then GCC 210 instructs the selected MCU to use a dial-out method to call the dial-out participant via IP trunking over IPN 120. At step 1018, the GCC 210 looks for the next participant in the loop, if there are no additional participants the exemplary method 1000 is terminated.

In the case where the decomposed architecture 100 (FIG. 1) is used, an exemplary method for setting up a reserved conference may be similar to the method 1000 in FIG. 10, with some modifications. For example, in system 100 (FIG. 1) the GCC 110 is an MC and it manages the various MP/MGW (140/240). Therefore, GCC 110 has to perform the signaling session with the various participants by itself and only after the call set-up is complete are the calls routed to the appropriate MP/MGW 150/140.

In the description and claims of the present application, each of the verbs "comprise," "include" and "have", and conjugates thereof, are used to indicate that the object or objects of the verb are not necessarily a complete listing of members, components, elements or parts of the subject or subjects of the verb. Alternate embodiments will become apparent to those skilled in the art to which the present invention pertains without departing from its spirit and scope. Accordingly, the scope of the present invention is described by the appended claims and supported by the foregoing description.

What is claimed is:

1. A multipoint communication system, comprising:
   a plurality of media control units adapted to send and receive communication signals with a plurality of end-points;
   a media gateway communicatively coupled to each of the plurality of media control units, said media gateway adapted to translate non-Internet protocol communication signals from at least one non-Internet protocol end-point to Internet protocol communication signals; and
   a controller adapted to establish and control a multipoint communication session between the at least one non-Internet protocol end-point and the plurality of end-points through at least one of the plurality of media control units and the media gateway,
   wherein communication signals between the media gateway, the plurality of media control units and the controller comprise Internet protocol communication signals, and
   wherein the controller is formed by duplicate modules, one duplicate module in at least two of the plurality of media control units, the duplicate modules communicatively coupled together.

2. The system of claim 1, wherein the media control unit comprises an audio bridge.

3. The system of claim 1, wherein the media control unit comprises a media processor.

4. The system of claim 1, wherein the media control unit comprises a multipoint control unit.

5. The system of claim 1, wherein at least one of the plurality of end points comprise an Internet protocol end-point.

6. The system of claim 5, wherein the Internet protocol end-point comprises an Internet Protocol multimedia end-point.

7. The system of claim 1, wherein said non-Internet protocol communication signals comprise switched circuit network protocol signals.

8. The system of claim 7, wherein said switched circuit network protocol signals comprise communication signals from a telephone.

9. The system of claim 8, wherein the telephone is selected from the group consisting of an analog telephone, a digital telephone and a cellular telephone.

10. The system of claim 7, wherein said switched circuit network protocol signals comprise signals from multimedia end-points selected from the group consisting of H.321, H.324 and H.320 compatible end-points.

11. The system of claim 1, wherein said at least one non-Internet protocol end-point is selected from the group consisting of H.321, $H._{324}$ and H.320 compatible end-points.

12. The system of claim 1, wherein the media gateway is further adapted to provide interactive voice response capability to said at least one non-Internet protocol endpoint.

13. The system of claim 12, wherein said at least one non-Internet protocol endpoint access the system through a single-dial conference service number (SDCSN).

14. The system of claim 1, wherein at least one of said plurality of end-points access the system through a single-dial conference service number (SDCSN).

15. The system of claim 1, wherein the media gateway is geographically separated from at least one of the plurality of media control units.

16. The system of claim 1, wherein the media gateway is geographically separated from the controller.

17. The system of claim 1, wherein the system comprises a Decomposed architecture.

18. The system of claim 1, wherein the system comprises a virtual multipoint control unit architecture.

19. A multipoint communication system, comprising:
   at least two media control units adapted to send and receive multipoint communication signals between a plurality of end-point devices;
   at least one non-Internet protocol end-point device communicatively coupled to the at least two media control units; and
   a controller adapted to establish and control a multipoint communication session between the plurality of end-point devices and the at least one non-Internet protocol end-point device through the at least two media control units,
   wherein communication between the at least two media control units and the controller uses the Internet protocol, and
   wherein the controller is formed by duplicate modules, one duplicate module in at least two of the plurality of media control units, the duplicate modules communicatively coupled together.

20. The system of claim 19, wherein at least one of the plurality of end-point devices comprise a non-Internet protocol end-point device.

21. The system of claim 20, wherein said at least one of the plurality of end-point devices is selected from the group consisting of H.321, $H._{324}$ and H.320 compatible end-point devices.

22. The system of claim 19, wherein at least one of the plurality of end-point devices comprise an Internet protocol end-point device.

23. The system of claim 19, further comprising a media gateway adapted to send and receive Internet protocol communication signals with the at least two media control units and the controller.

24. The system of claim 23, wherein the media gateway comprises an interactive voice response unit.

25. A system for conducting a multipoint media conferencing between a plurality of end-points, wherein at least one of said plurality of end-points is a non-Internet protocol network end-point, the system comprising:
- at least two media control units adapted to send and receive multimedia communication signals, wherein said at least two media control units are adapted to communicate over an Internet network;
- a media gateway communicatively coupled to each of said at least two media control units through the Internet protocol network, said media gateway adapted to translate non-Internet media communication protocol signals from at least one non-Internet protocol network end-point to Internet media communication protocol signals; and
- a controller communicatively coupled to said media gateway and said at least two media control units through the Internet protocol network;
- wherein when said media gateway receives single-dial conference service number call from the at least one non-Internet protocol network end-point said controller establishes a multipoint media conferencing session in response to the act of said media gateway receiving said single-dial conference service number call; and
- wherein said translated non-Internet media communication protocol signals from the at least one non-Internet protocol network end-point are routed to at least one of said at least two media control units over the Internet protocol network in accordance with routing instructions from said controller.

26. The system of claim 25, wherein said Internet protocol network comprises a plurality of separate Internet protocol networks.

27. The system of claim 25, wherein when said controller establishes said multipoint media conferencing session, said controller invokes an interactive voice response unit in said media gateway.

* * * * *